(12) United States Patent
Bardin et al.

(10) Patent No.: US 8,594,600 B2
(45) Date of Patent: Nov. 26, 2013

(54) APPARATUS FOR THE SELF HEALING OF THE GAIN OF BROADBAND RECEIVERS

(75) Inventors: Joseph C Bardin, Northampton, MA (US); Ali Hajimiri Seyed, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 413 days.

(21) Appl. No.: 12/949,719

(22) Filed: Nov. 18, 2010

(65) Prior Publication Data

US 2012/0157005 A1 Jun. 21, 2012

Related U.S. Application Data

(60) Provisional application No. 61/262,502, filed on Nov. 18, 2009.

(51) Int. Cl.
H04B 17/00 (2006.01)
H04B 1/06 (2006.01)
H04B 7/00 (2006.01)
H04B 15/00 (2006.01)

(52) U.S. Cl.
USPC ............... 455/226.1; 455/234.1; 455/314

(58) Field of Classification Search
USPC .......... 455/232.1, 234.1, 234.2, 226.1, 226.2, 455/314, 315, 323
See application file for complete search history.

(56) References Cited

U.S. PATENT DOCUMENTS

| 4,703,520 A * | 10/1987 | Rozanski et al. ............. 455/75 |
| 7,643,810 B2 * | 1/2010 | Husted et al. ............. 455/226.1 |
| 2011/0059709 A1 * | 3/2011 | Collins, III ............. 455/226.1 |

* cited by examiner

Primary Examiner — Nguyen Vo
(74) Attorney, Agent, or Firm — Milstein Zhang & Wu LLC; Joseph B. Milstein

(57) ABSTRACT

An integrated RF device includes at least one RF amplifier configured to be electrically coupled alternatively to a selected one of a RF signal input and a RF test source. A first mixer stage includes a first local oscillator and is electrically coupled to the at least one RF amplifier. At least one second mixer stage includes a second local oscillator and is electrically is coupled to the first mixer. The at least one baseband amplifier is electrically coupled to the second mixer. At least a selected one of the RF amplifier and the baseband amplifier has at least one actuator and at least one actuator terminal configured to provide an actuator setting. A method to self-heal an integrated RF receiver device is also described.

20 Claims, 36 Drawing Sheets

30um

50um

| Stage | Mean | Sigma |
|---|---|---|
| 0/0.25dB | 0.26 dB | 5.8 mdB |
| 0/0.5dB | 0.56 dB | 11.7 mdB |
| 0/1.0dB | 1.01 dB | 21.1 mdB |
| 0/2.0dB | 1.97 dB | 42.3 mdB |
| 0/4.0dB | 4.00 dB | 74.1 mdB |
| 0/8.0dB | 7.97 dB | 137.2 mdB |
| 0/16.0dB | 15.95 dB | 274 mdB |

FIG. 18

APPARATUS FOR THE SELF HEALING OF THE GAIN OF BROADBAND RECEIVERS

CROSS-REFERENCE TO RELATED APPLICATIONS

This application claims priority to and the benefit of co-pending U.S. provisional patent application Ser. No. 61/262,502, Apparati for the Self Healing of the Gain and Noise Figure of Broadband Receivers, filed Nov. 18, 2009. This application is related to U.S. patent application Ser. No. 12/949,679, filed Nov. 18, 2010, U.S. patent application Ser. No. 12/806,906, filed Aug. 24, 2010, entitled ELECTRONIC SELF-HEALING METHODS FOR RADIO-FREQUENCY RECEIVERS, and U.S. patent application Ser. No. 12/877,743, filed Sep. 8, 2010, entitled SELF-HEALING TECHNIQUE FOR HIGH FREQUENCY CIRCUITS. All of the enumerated applications above are incorporated herein by reference in their entirety for all purposes.

STATEMENT REGARDING FEDERALLY FUNDED RESEARCH OR DEVELOPMENT

The U.S. Government has certain rights in this invention pursuant to Grant No. FA8650-09-C-7925 awarded by DARPA.

FIELD OF THE INVENTION

The invention relates to radio receivers in general and particularly to a radio receiver that employs self healing.

BACKGROUND OF THE INVENTION

With scaling to the nanometer regime and improvements in trans-conductance and parasitics, many sophisticated integrated systems can now be implemented in CMOS. However, as feature sizes shrink, new challenges arise, as process, voltage, and temperature (PVT) variations grow larger and more difficult to control. For instance, the small number of dopants in the channel becomes an important source of randomness, rendering traditional techniques (e.g., common-centroid or interdigitated designs) ineffective. From an RF system perspective, such variations can be detrimental since parameters such as gain are not well controlled.

There is a need for a device structure and method of operation for sophisticated integrated systems which increases device fabrication and manufacturing yield and which adapts such devices to changing environmental factors present in operational use.

SUMMARY OF THE INVENTION

According to one aspect, the invention features an integrated RF device including at least one RF amplifier configured to be electrically coupled alternatively to a selected one of a RF signal input and a RF test source. A first mixer stage includes a first local oscillator. The first mixer is electrically coupled to the at least one RF amplifier. The at least one second mixer stage includes a second local oscillator. The at least one second mixer electrically is coupled to the first mixer. At least one baseband amplifier is electrically coupled to the second mixer. The at least one baseband amplifier has at least one base band output terminal. At least a selected one of the RF amplifier and the baseband amplifier has at least one actuator and at least one actuator terminal configured to provide an actuator setting. At least one terminal is configured to receive an electrical voltage to power the integrated RF device.

In one embodiment, the integrated RF device further includes a processor which is configured to perform a computation and has as input a sensor configured to provide a parameter measured while the RF amplifier is electrically coupled to the RF test source. The computation is configured to generate at least one self healing calibration setting of the at least one actuator to cause a gain calibration of a self healing dual conversion RF receiver.

In another embodiment, the self healing dual conversion RF receiver is disposed on a single semiconductor substrate with the integrated RF device.

In yet another embodiment, the device is fabricated in a CMOS process.

In yet another embodiment, the at least one actuator is configured to set a gain as a function of frequency.

In yet another embodiment, the gain calibration of the integrated RF receiver is configured to compensate for a variation selected one of a fabrication process variation, a variation in the self healing dual conversion RF receiver due to operational use including aging, and a variation in an ambient environmental factor including a temperature, a pressure, and a humidity.

In yet another embodiment, the RF test source includes a tone generator.

In yet another embodiment, the tone generator includes a frequency divider and an injection locked frequency tripler.

In yet another embodiment, the tone generator further includes an additional injection locked frequency tripler configured to reduce sub-harmonic content.

In yet another embodiment, the tone generator further includes a servo controlled attenuator configured to level a tone generator output power at different frequencies.

In yet another embodiment, the RF test source includes a noise source.

In yet another embodiment, the at least one second mixer includes an I second mixer and a Q second mixer and the at least one baseband output terminal includes at least one I baseband output terminal and at least one Q baseband output terminal.

In yet another embodiment, at least one of the at least one RF amplifier and the baseband amplifier includes a selected one of a tunable capacitor actuator, a tunable compensation resistor actuator, and a tunable bias DAC actuator.

In yet another embodiment, the tunable capacitor actuator includes a switch selected varactor capacitor.

In yet another embodiment, the tunable compensation resistor actuator includes a negative resistance configured to perform at least a selected one of gain adjustment and compensation for inductor loss.

In yet another embodiment, at least one of the at least one RF amplifier and the baseband amplifier includes a variable gain amplifier (VGA) having a plurality of switch selectable gain stages.

In yet another embodiment, the plurality of switch selectable gain stages includes a plurality of binary weighted gain stages.

In yet another embodiment, the at least one RF amplifier has two input terminals includes a first input terminal configured to be electrically coupled to the RF input terminal and a second input terminal configured to be electrically coupled to the RF test source.

In yet another embodiment, the RF test source is enabled during a self healing calibration.

In yet another embodiment, the integrated RF device further includes additional sets of the RF amplifier, the RF test source, the first mixer stage including a first local oscillator, the at least one second mixer stage including a second local oscillator, the at least one baseband amplifier electrically coupled to the second mixer configured, to provide a receiver having two or more bands.

According to another aspect, the invention features a method to self-heal an integrated RF receiver device including the steps of: providing a RF receiver which includes a RF test source configured to be momentarily applied to a RF input of the RF receiver device, at least one sensor to measure a parameter indicative of a power, and a processor configured to control at least one actuator disposed on a integrated dual conversion RF receiver device wherein the at least one actuator sets a gain as a function of frequency; sensing the parameter indicative of the power when the RF test source is momentarily applied to the RF input of the integrated RF receiver device; calculating a setting of the at least one actuator which is expected to improve a tuning of the integrated RF receiver device; and applying the calculated setting of the at least one actuator to the at least one actuator.

In one embodiment, the method to self-heal an integrated RF receiver device further includes the step of repeating automatically the steps from sensing the parameter indicative of power to applying the setting while the integrated dual conversion RF receiver is operational.

In another embodiment, the step of providing a RF receiver includes providing a RF receiver having a temperature sensor, and the method further includes the step of repeating automatically the steps from sensing the parameter indicative of power to applying the setting when a variation in temperature greater than a predetermined temperature variation is sensed by the temperature sensor.

In yet another embodiment, the RF test source includes a tone generator and the step of sensing the parameter indicative of power includes a selected one of: chopping followed by synchronous detection, and measuring directly a DC voltage.

In yet another embodiment, the RF test source includes a noise generator and the step of sensing the parameter indicative of power includes squaring a detected voltage.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 5 shows a graph of conversion gain versus frequency for typical settings and with an automatic correction turned on.

FIG. 18 shows a table of Monte Carlo simulated mean and sigma values for 500 Monte Carlo runs.

DETAILED DESCRIPTION

We describe hereinbelow robust RF/analog circuitry for use in highly stochastic design spaces (e.g., process variations and operational environmental factors) which includes built-in circuitry such that the system can detect imperfections and correct for its intrinsic flaws autonomously. In such a system, "sensors" and "actuators" are added throughout the design. A loop can be closed and sensor outputs can be used to determine (e.g., by use of digital processing) values for actuator settings which are expected to improve the performance of the RF/analog circuitry, such as an RF receiver. Such autonomous corrections (also referred to as "self healing") can be performed automatically during operation of the RF/analog circuitry.

Figure 1:
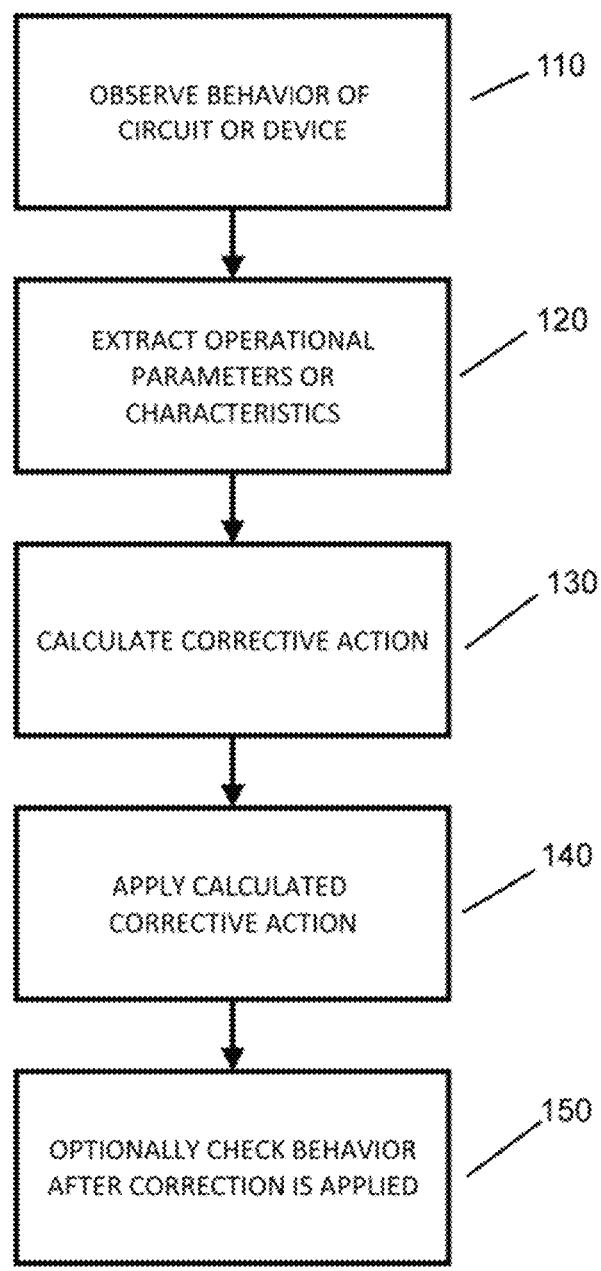
FIG. 1 is a schematic flow chart showing the overall system and process for a self-healing circuit or device.

FIG. 1 shows an exemplary schematic flow chart 100 of the overall system and process for a self-healing circuit or device. As illustrated in FIG. 1, at step 110, the behavior of a circuit or a device in response to an input signal is observed. In some embodiments, the input signal is a test signal or a pre-defined signal. This observation can be performed by components on the chip, or by components off the chip. At step 120, one extracts or derives one or more operational parameters or characteristics of the circuit or the device. At step 130, one calculates a corrective action, if needed, to bring the operational parameters or characteristics of the circuit or device within a desired range. The corrective action can be one or both of the application of a correction signal and a modification of one or more parameters or characteristics of an element in the circuit. At step 140, one applies the calculated corrective action, if needed, to bring the operational parameters or characteristics of the circuit or device within the desired range. Optionally, at step 150, one checks the operational parameters or characteristics of the circuit or the device after the correction is effectuated. In some embodiments, steps 120, 130, 140 and 150 can be repeated if it is determined that the one or more operational parameters or characteristics of the circuit or the device after the correction has been applied is still not within the desired range.

Turning now specifically to conversion gain in RF/analog circuitry, we describe hereinbelow embodiments of on-chip methods, architectures, and circuits suitable for automatic calibration of conversion gain. Such techniques are believed suitable for use in most generic tunable broadband RF systems.

Figure 2A:
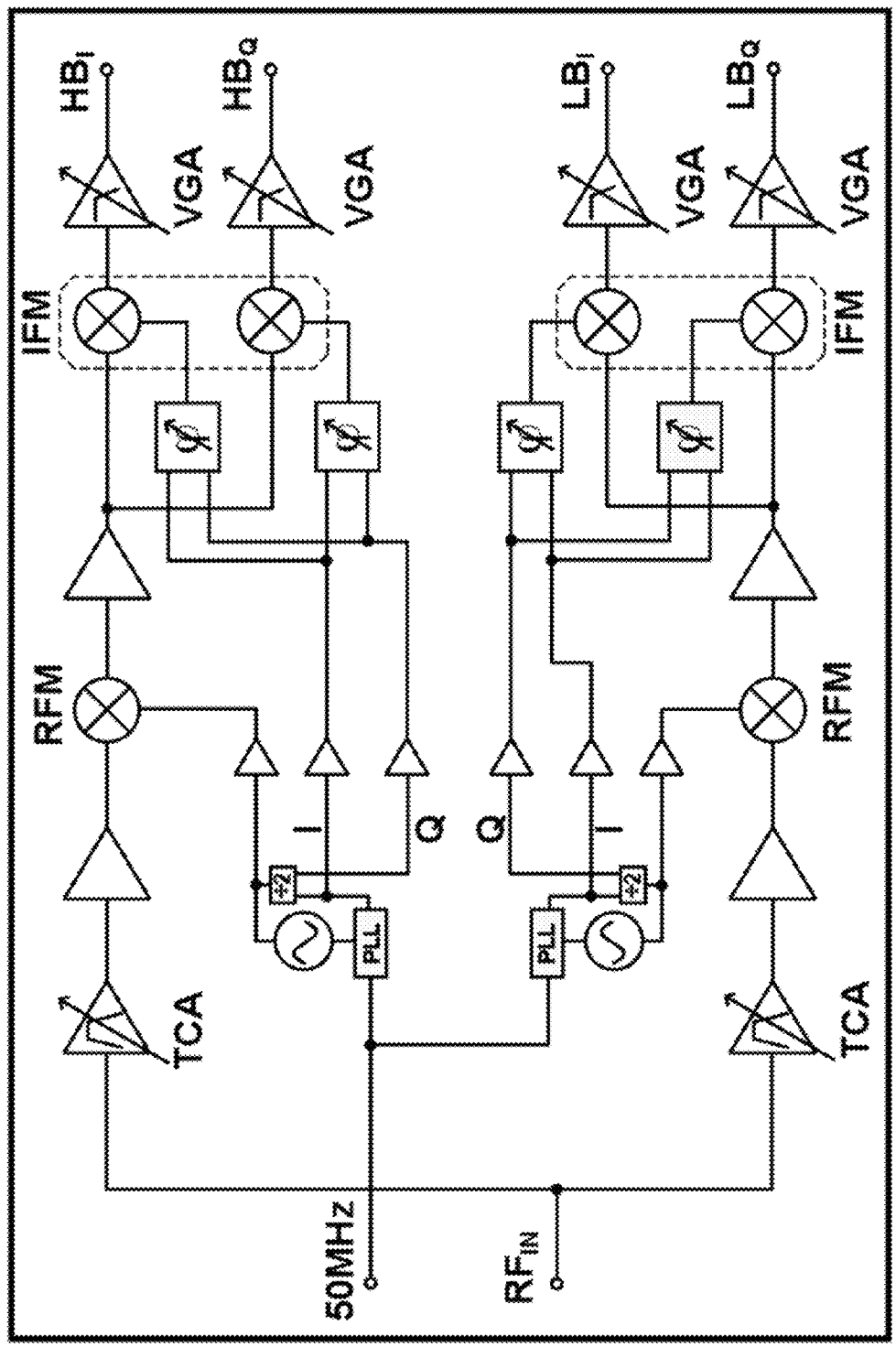
FIG. 2A shows a block diagram of one exemplary embodiment of a dual-band concurrent receiver system using an integrated RF device according to the invention.
Figure 2B:
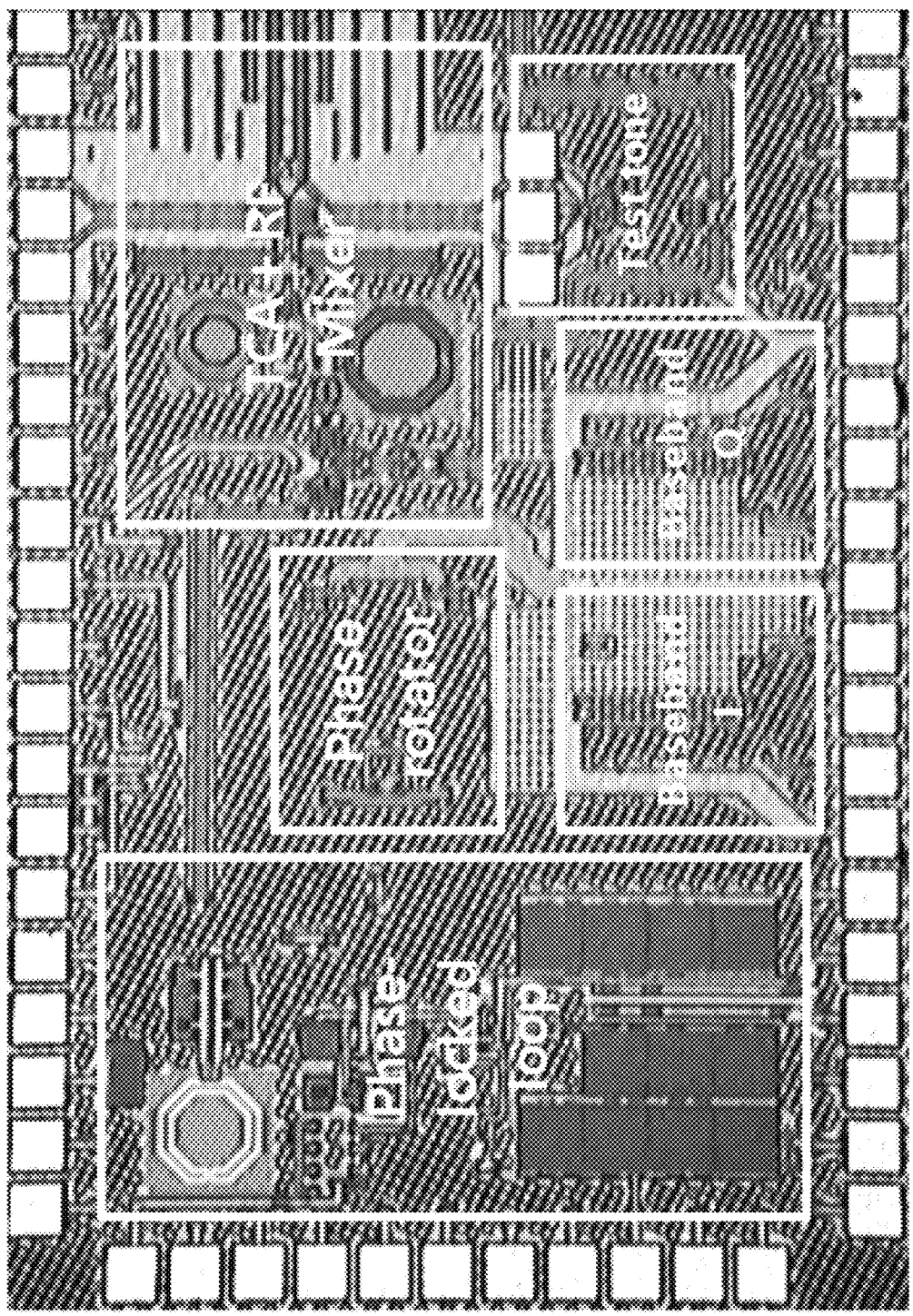
FIG. 2B shows a chip micrograph of one exemplary integrated RF device according to FIG. 2A.

We begin with an implementation example, a 6.5 to 10.6 GHz phased array receiver element implemented in 65 nm low-power CMOS device. This phased array receiver element performs a self-correction of the errors in both gain flatness and phase accuracy. FIG. 2A shows a block diagram of the receiver system used to demonstrate these automatic gain correction schemes. The exemplary down-conversation scheme uses a dual-band concurrent super-heterodyne down-converter, complete with two independent phase-locked loops and baseband phase rotators to allow for beam-forming of multiple elements. FIG. 2B shows a chip micrograph of one exemplary integrated RF device according to FIG. 2A.

Figure 3:
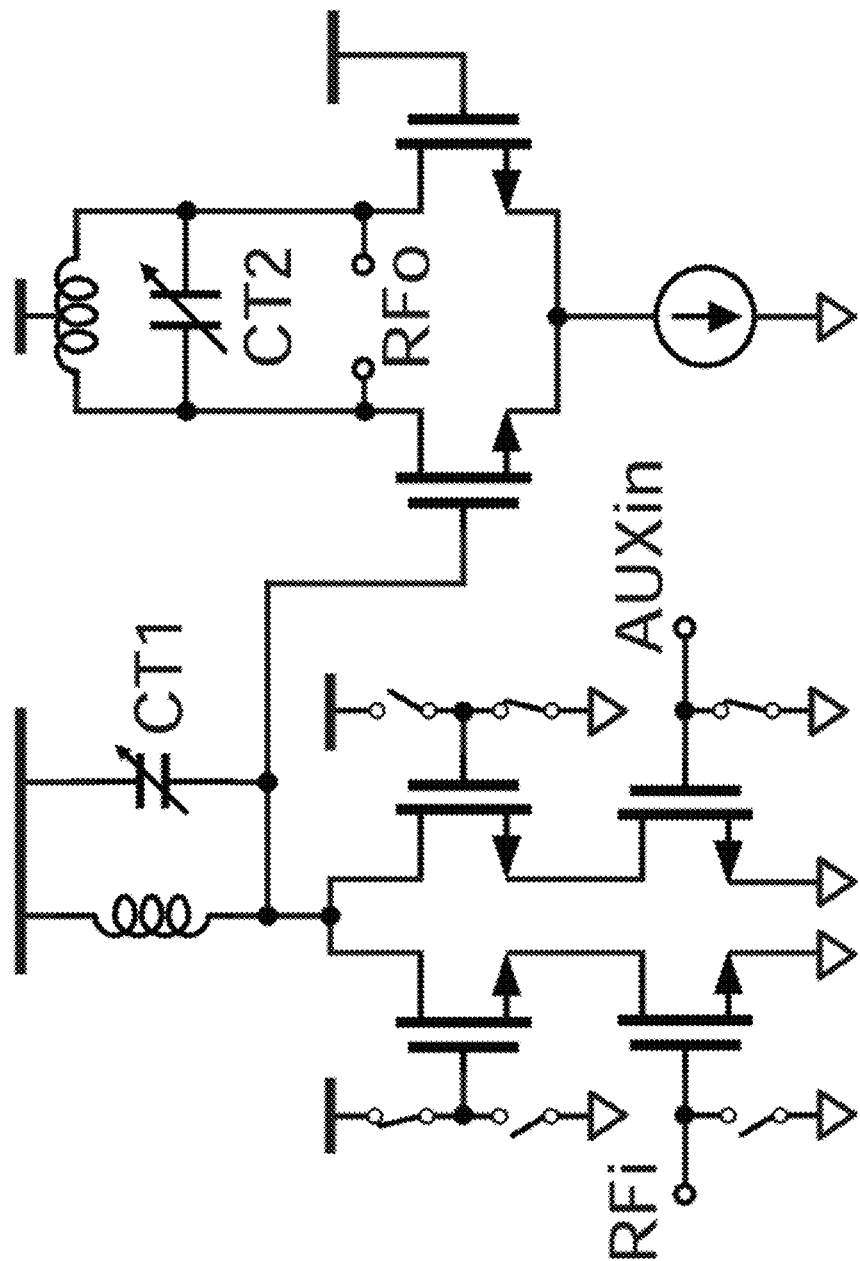
FIG. 3 shows schematic diagram of an exemplary tunable front-end amplifier.
Figure 4:
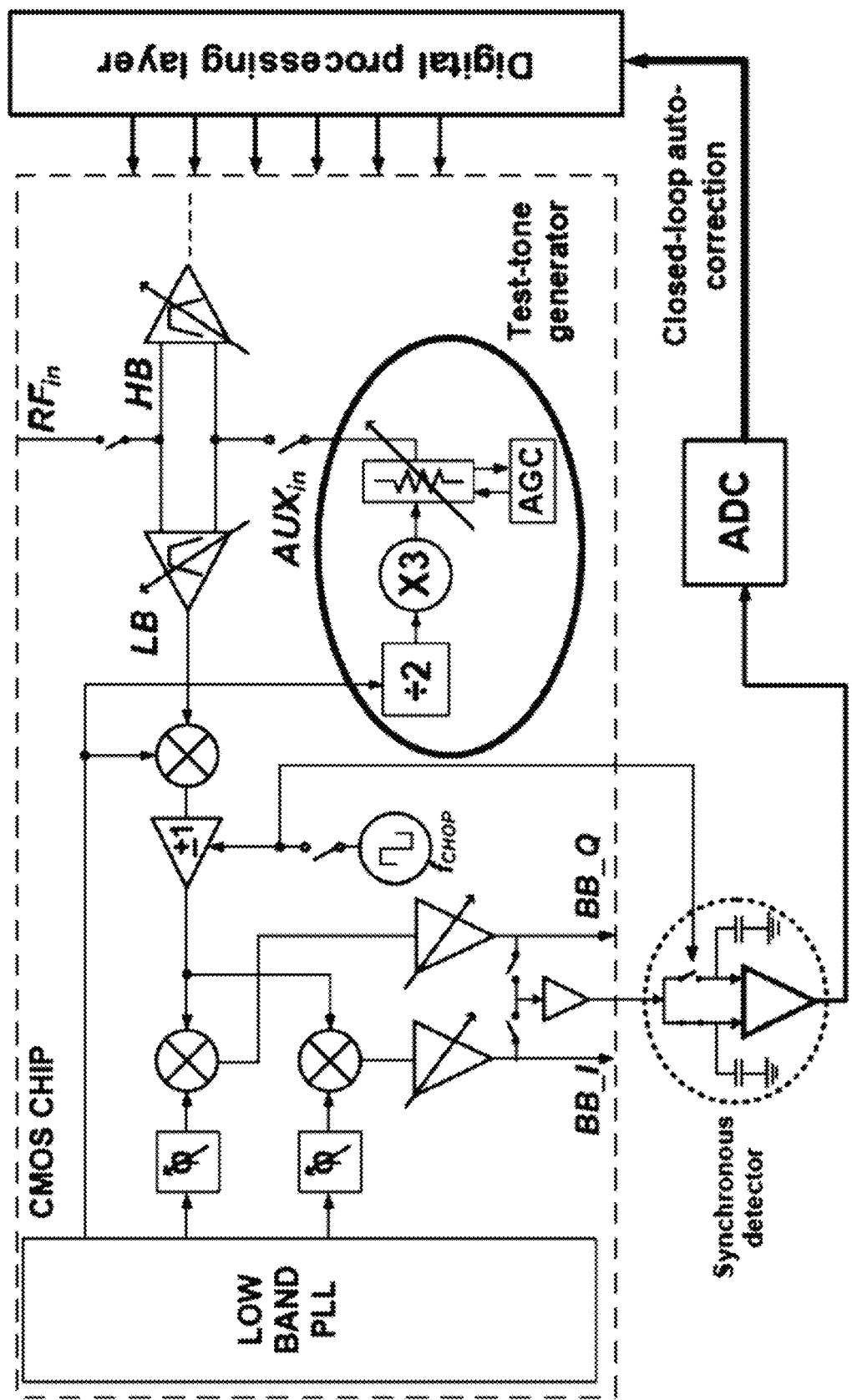
FIG. 4 shows a block diagram of an exemplary scheme that can be used to sense and correct the conversion gain of the RF path.

FIG. 3 shows an exemplary tunable front-end amplifier architecture which has been realized in this implementation. FIG. 4 shows the exemplary scheme which was used to sense and correct the conversion gain of the RF path. For signal detection, an on-chip 50Ω sinusoidal signal source was injection-locked to the third harmonic of a divided version of the RF local oscillator. This injection-locked signal provided a proper down-conversion of the desired signal to the baseband. To accurately sense the conversion gain of the system, the available power from the signal source was made independent of frequency through the use of a local feedback loop that drove a variable attenuator which was controlled by a broadband detector. Either a variable or fixed attenuator can be used to provide a constant 50Ω output impedance and also serve to reduce the available power, in some embodiments, down to a nano Watt level. The output of the test-tone generator was coupled to the receiver via a dedicated auxiliary input stage, as shown in FIG. 3 and FIG. 4. In order to emulate the main signal path, the auxiliary stage was made substantially identical in size and layout to the main stage. After passing through the front-end, the test tone was converted to baseband (DC) via a two-step down-conversion process with RF and baseband local oscillator (LO) signals centered at ⅔ and ⅓ of the RF frequency respectively. In order to avoid uncertainty due to dc offsets and 1/f noise, the polarity of the RF signal driving the baseband was chopped at a frequency in the kHz range, and the modulated baseband signal was recovered using an off-chip synchronous detector that fed an analog to digital converter (ADC). Finally, to obtain a measure of the gain, the second LO phase rotator was used to sequentially provide the I (in-phase) and Q (quadrature) components.

Figure 5:
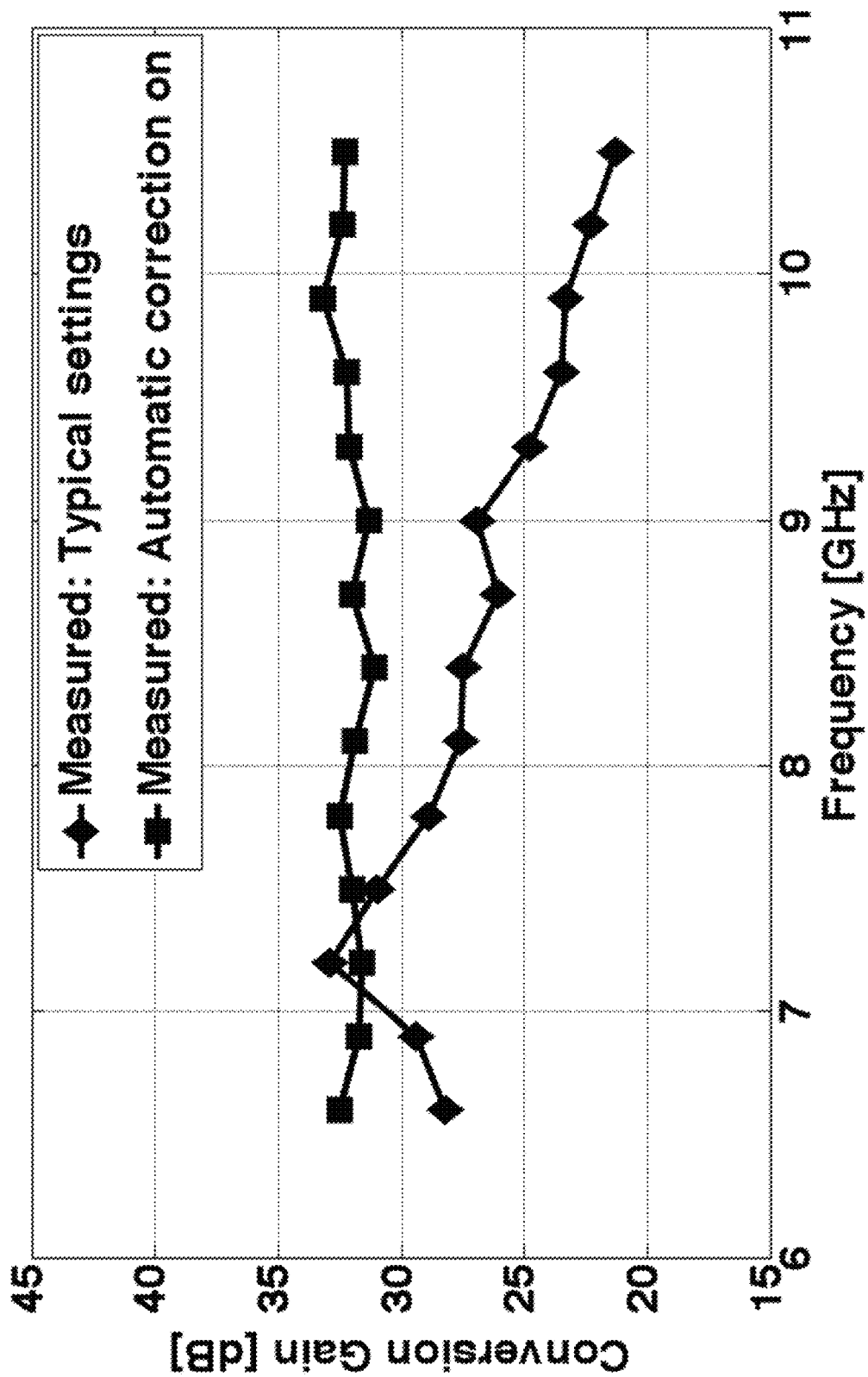

In this exemplary implementation, automated correction of the gain flatness was achieved as follows: first, the five bit values of tuning capacitors CT1 and CT2 (FIG. 3) were chosen to maximize the detected I & Q baseband components. The final degree of freedom for setting the gain was the value of the baseband VGA which was set at a single frequency and then an automated gradient decent search was applied to minimize the variation in the observable baseband signals across frequencies, resulting in the gain flattening shown in the measured conversion pre- and post-correction graph of FIG. 5. With the correction enabled, the RMS gain flatness was found to be 0.52 dB across the entire 6.6-10.5 GHz operating range of the receiver as opposed to 3.2 dB when the correction was disabled and the receiver was set to its typical tuning values.

Figure 6:
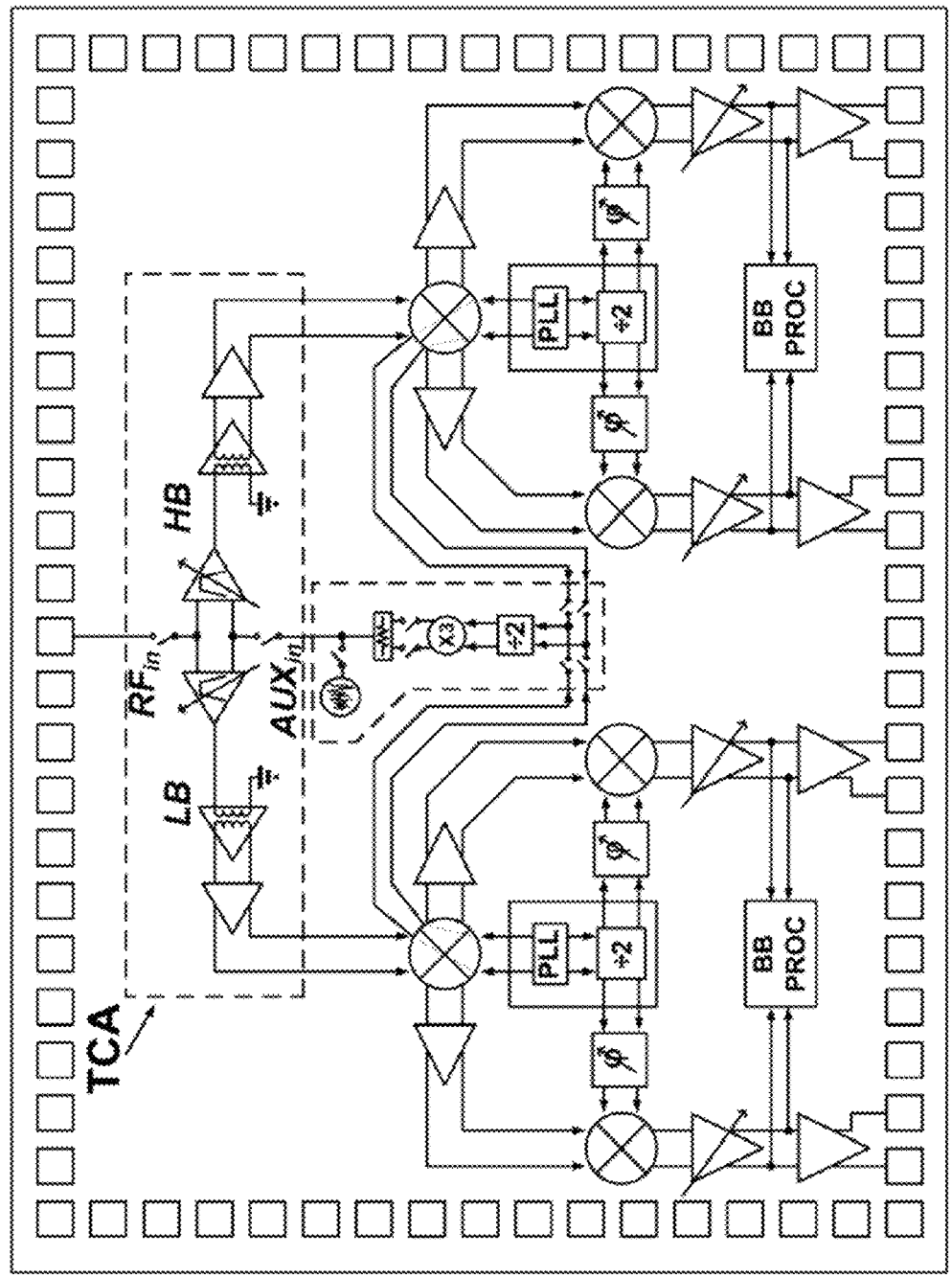
FIG. 6 shows a block diagram of an exemplary self healing integrated dual conversion RF device according to the invention.

Turning now to FIG. 6, we describe in more detail various embodiments of on-chip methods, architectures, and circuits believed to be suitable for the self healing and/or automatic calibration of full conversion gain. FIG. 6 shows a block diagram of one exemplary self healing integrated dual conversion RF receiver device according to the invention. In the embodiment of FIG. 6, the first RF amplifier has two inputs, one for the $RF_{in}$ (RF input signal) and one for the $AUX_{in}$ path. A RF test source can be coupled into the RF amplifier via switch selectable $AUX_{in}$ path. Such use of a two input RF amplifier is believed to be particularly advantageous, as compared with a single input RF amplifier, typically having a lossy series input switch to select between the two sources ($RF_{in}$ and $AUX_{in}$). To illustrate suitable noise and test tone methods, the test source is shown in FIG. 6 as an optional selection of a noise source and a RF test source. In most embodiments however, as described in more detail hereinbelow, generally only one test source (typically a noise source or a tone source) is present. The RF test source, tone generator, selects a local oscillator operating at frequency f (from one of the dual bands) and divides by 2, then multiplies by 3 to give a 3/2 f test tone signal. The 3/2 f test tone signal has been found to be particularly desirable, since when mixed back down to base band by the integrated dual conversion RF receiver device, the output signal, indicative of signal level, is a DC level. In embodiments where a noise source is used, the output voltage can be squared to give a signal power level. While in most embodiments, only one test source (typically a noise test source or a tone generator) source will be present, more than one method (e.g., the noise method and the test tone method) can be implemented (typically including a method selection as shown in FIG. 6) on one device.

Figure 7:
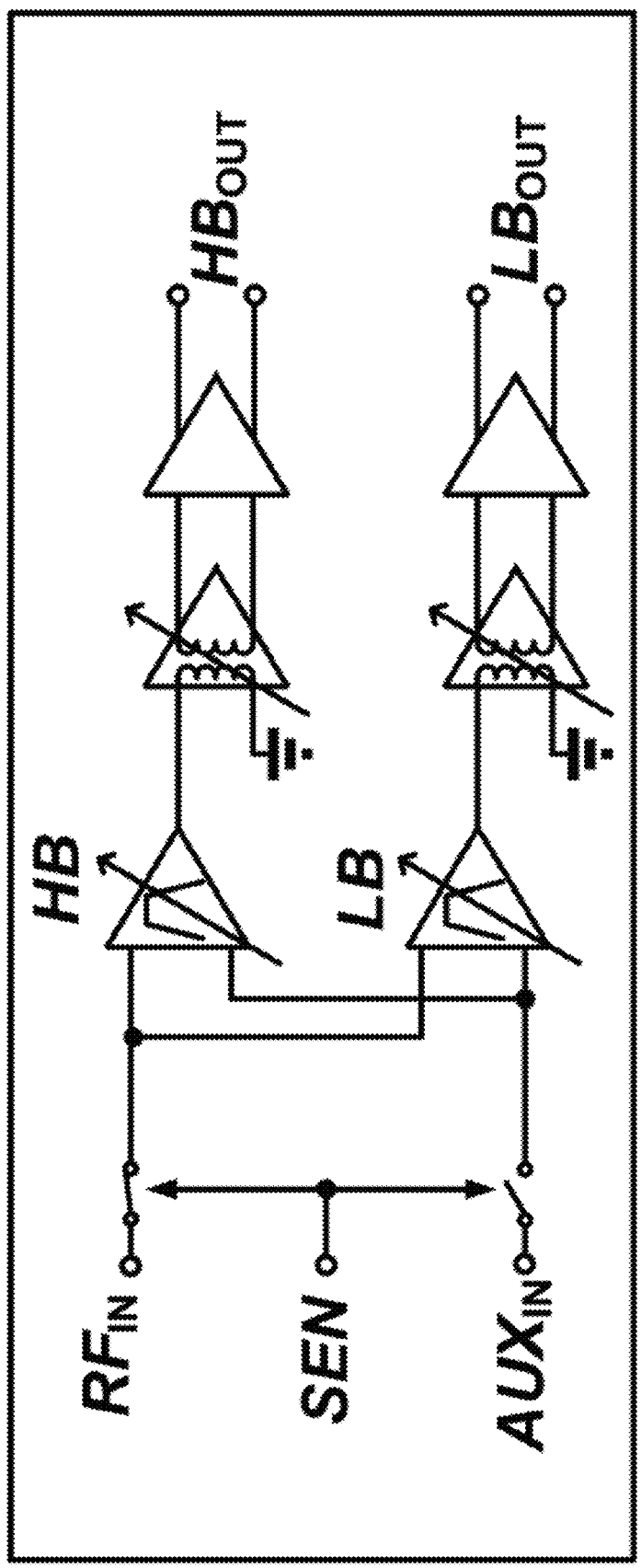
FIG. 7 shows a block diagram of an exemplary tunable concurrent low noise amplifier (TCLNA) suitable for use in a self healing integrated dual band dual conversion RF receiver.

FIG. 7 shows a block diagram of an exemplary tunable concurrent low noise amplifier (TCLNA) suitable for use in a self healing integrated dual band dual conversion RF receiver device. As described hereinabove, in some embodiments, each LNA has two inputs which can be used to switch in either $RF_{in}$ or $AUX_{in}$ (the test source), without need for a more conventional series RF switch to select between the two signal sources. Thus, the auxiliary input ($AUX_{in}$, for coupling a test signal from a tone generator or noise test source) removes the need for a lossy series switch at the input to the LNA. The input stage of the TCLNA of FIG. 7 provides low noise amplification, frequency selectivity, diplexing, and a 50Ω input match. An active balun provides ability to drive differential stages and also reduces sensitivity to ground inductance. There is sufficient gain to dominate system noise, and a buffer stage provides isolation from the RF mixer. The power dissipation for some embodiments of our TCLNA is on the order of 55 mW.

Figure 8A:
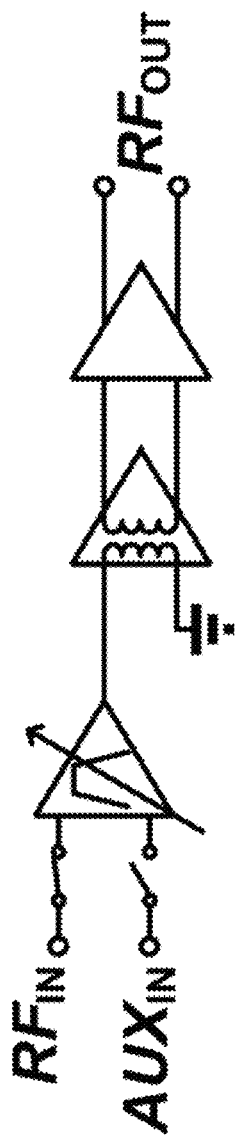
FIG. 8A shows a block diagram of a single band low noise amplifier (LNA).
Figure 8C:
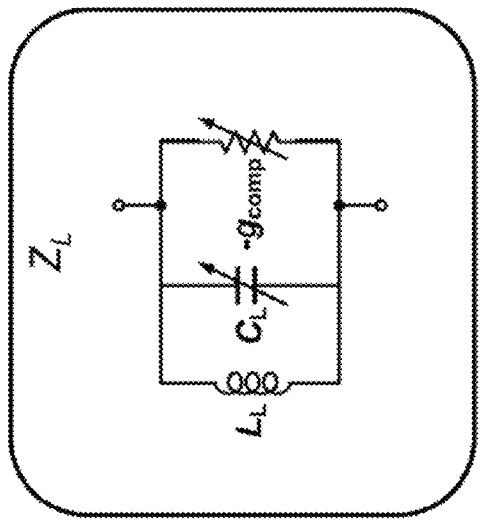
FIG. 8C shows a schematic diagram of one exemplary $Z_L$ of FIG. 8B having two actuators.
Figure 8B:
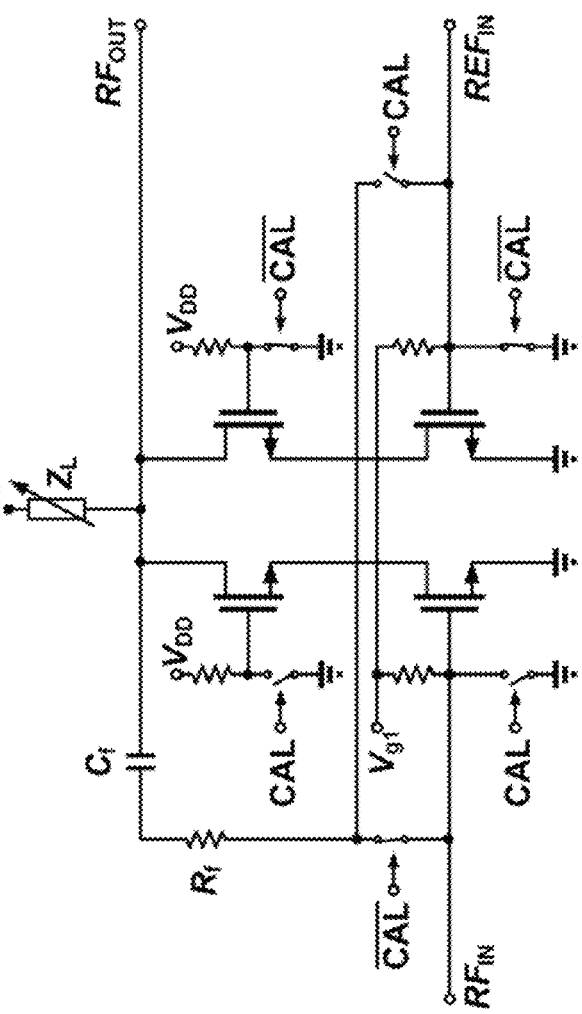
FIG. 8B shows an exemplary schematic diagram of one embodiment of the input stage of the block diagram of FIG. 8A.

FIG. 8A shows a block diagram of a single band LNA. One embodiment of the input parallel switch scheme described hereinabove, which can be used to configure the LNA for two selectable inputs (as opposed to the less desirable approach of one lossy series switch at the input to the LNA) is shown in more detail in the exemplary schematic diagram FIG. 8B. The $Z_L$ block of FIG. 8C (shown to the right of FIG. 8B) illustrates two exemplary actuators suitable for self healing, a $C_L$ settable to 5 bit resolution (e.g., five binary weighted switch (bit) selectable varactor diodes) and a gain setting having an 8 bit DAC controlled $A_v$ (gain) control. A negative resistance ($-g_{comp}$) compensates for loss in the inductor and controls $A_v$ (gain). An eight bit bias DAC can also be added (not shown) to provide a bias (e.g., bias current or bias voltage) actuator. Additional actuators, such as CL, ($-g_{comp}$), and a bias DAC can be used to provide additional degrees of freedom in other amplifiers of a self healing integrated dual conversion RF receiver device. While we report herein exemplary numbers of weighted switches or DAC bits, those skilled in the art will understand that any suitable number of weighted switches or DAC bits (DAC resolution) can be used to satisfy a desired resolution for any given actuator.

Figure 9:
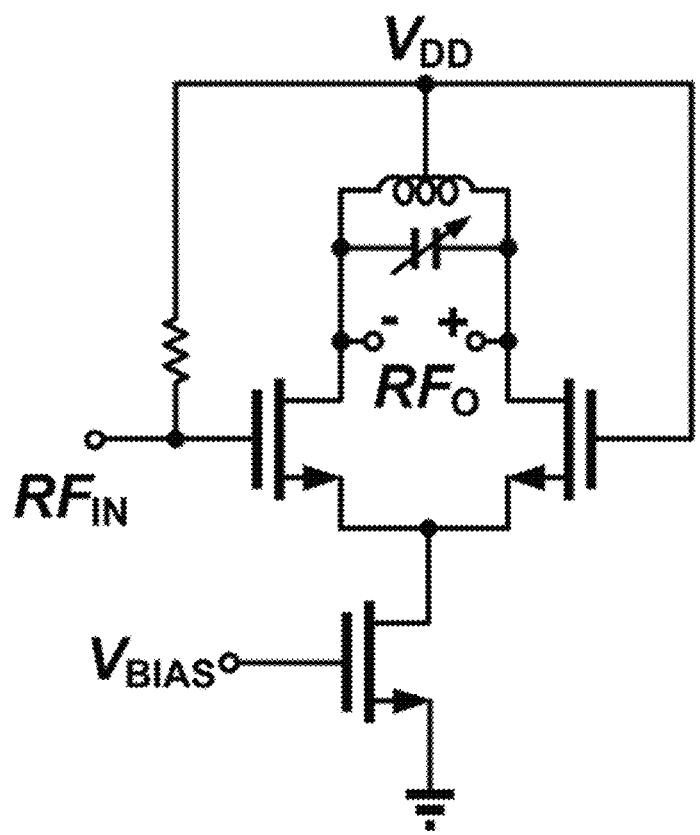
FIG. 9 shows a schematic diagram of one suitable circuit topology for the tuned LNA architecture of FIG. 8A.

FIG. 9 shows a schematic diagram of one suitable circuit topology for the tuned LNA architecture of FIG. 8A. The active balun translates an early stage single ended output to balanced $RF_{out}$ output terminals ("terminals" here referring to traces or other interconnecting technologies as used in an integrated process). This is a tuned (frequency selective) design of determinate bandwidth. The center frequency can be set, for example, by setting a capacitor actuator having an n-bit resolution. A 5 bit resolution was used in some embodiments of our prototype designs.

Figure 10B:
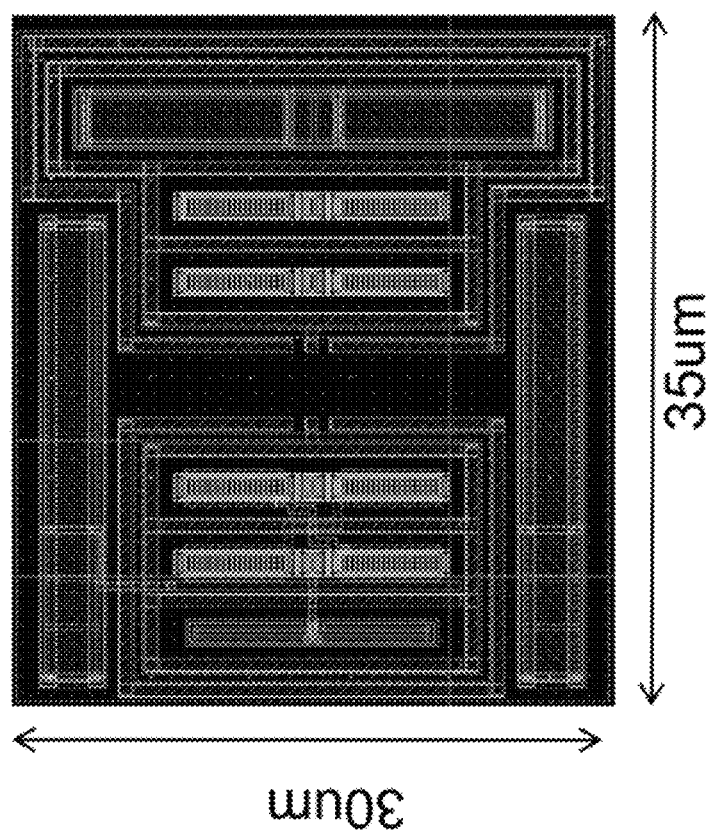
FIG. 10B a chip micrograph of the exemplary buffer stage of FIG. 10A.
Figure 10A:
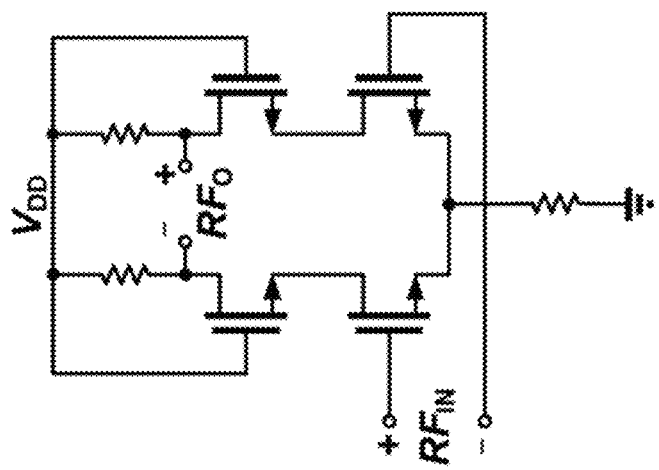
FIG. 10A show a schematic diagram of an exemplary TCLNA buffer stage.

FIG. 10A and FIG. 10B show a schematic diagram (FIG. 10A) and chip micrograph (FIG. 10B) of one exemplary buffer stage used to isolate the active balun tank circuit from the dynamic input capacitance of the RF mixer. In some embodiments, a cascode topology with triple well devices can be used to further improve the isolation.

Figure 11:
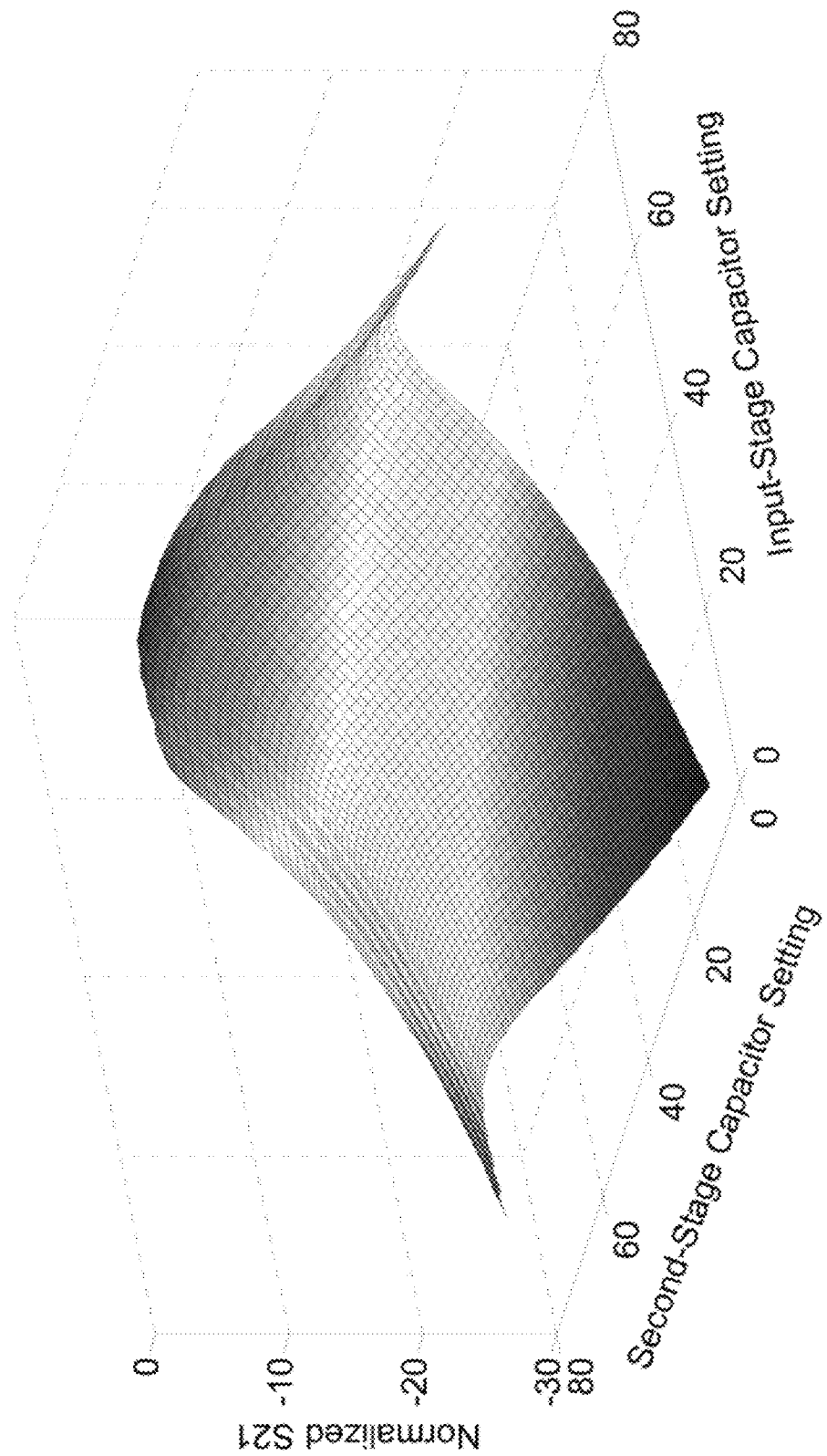
FIG. 11 shows a three dimensional graph illustrating one exemplary normalized S21 (transmission) response plotted as a function of two degrees of freedom (two actuator settings).

FIG. 11 shows a three dimensional graph that illustrates one exemplary S21 (transmission) response plotted as a function of two degrees of freedom, 1) input stage capacitor actuator setting, and 2) second-stage capacitor actuator setting. This simulation result, showing a smooth gain surface having a peak gain of about 30 dB, was made for a center band operating frequency of about 15.2 GHz.

Figure 12A:
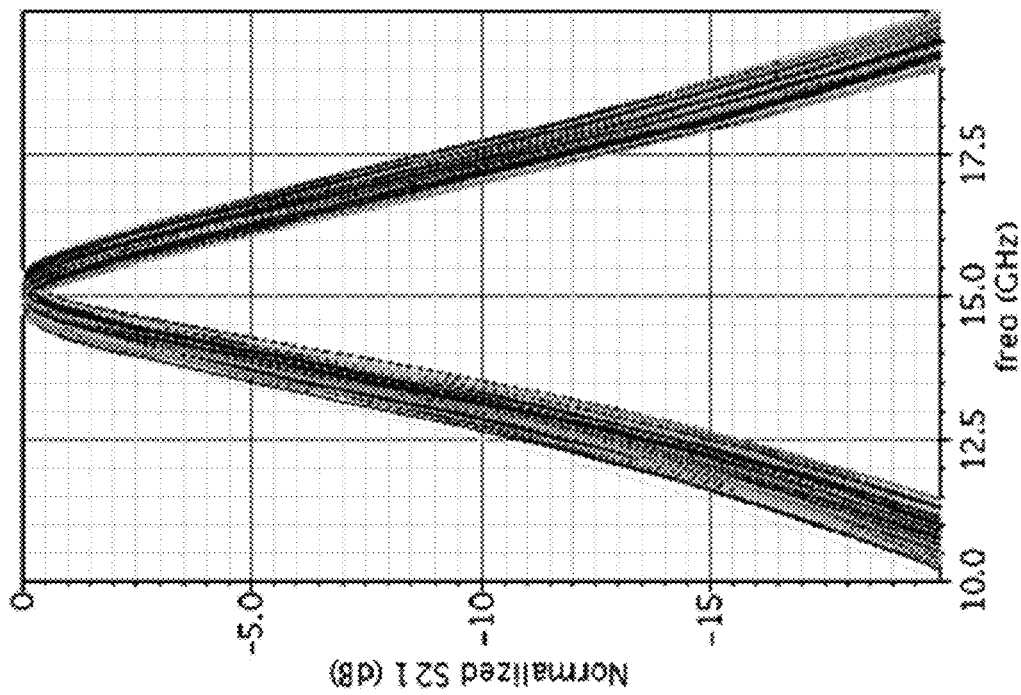
FIG. 12A shows a Monte Carlo simulation graph of S11 (reflection) for a TCLNA according to FIG. 8A.
Figure 12B:
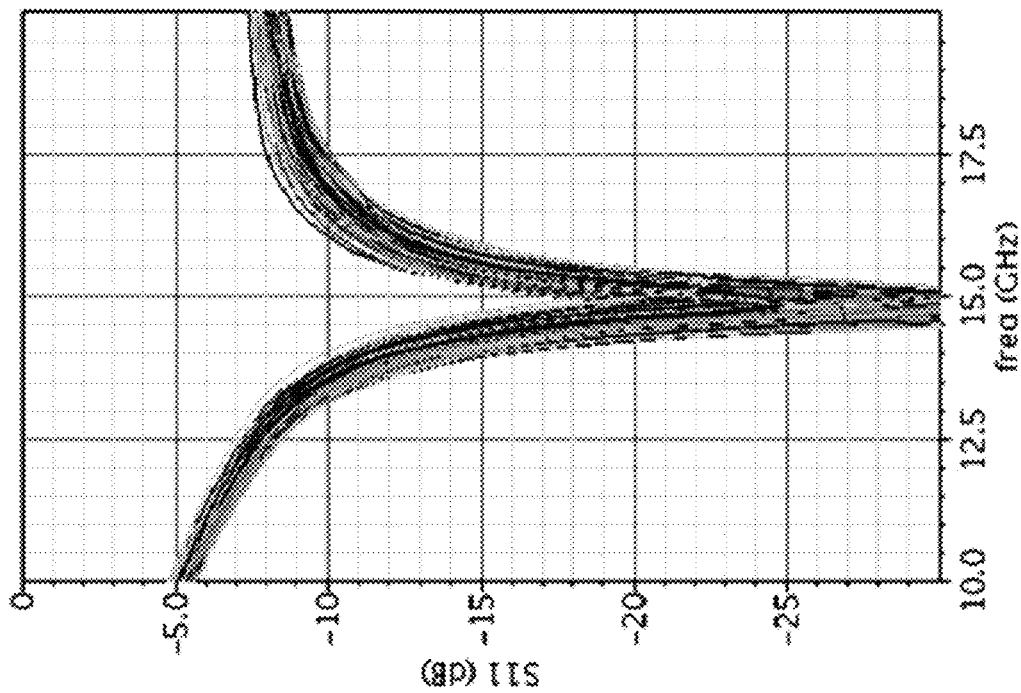
FIG. 12B shows a Monte Carlo simulation graph of normalized S21 (transmission) for a TCLNA according to FIG. 8A.

FIGS. 12A and 12B show two graphs of S11 (reflection, FIG. 12A) and S21 (transmission, FIG. 12B) resultant curves for a. Monte Carlo simulation of a TCLNA.

Figure 13A:
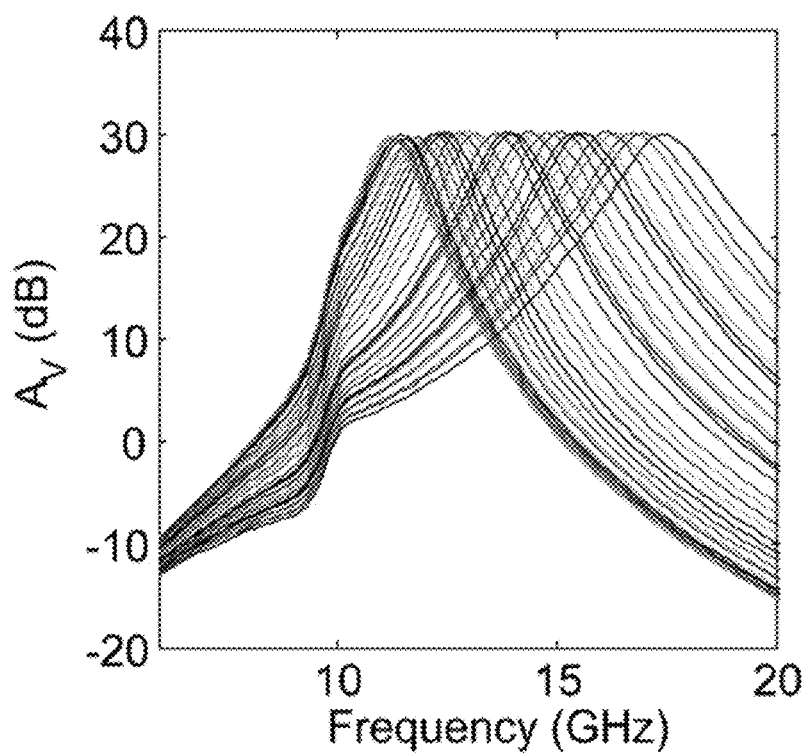
FIG. 13A shows a simulation graph of AV (gain) for a TCLNA according to FIG. 8A.
Figure 13B:
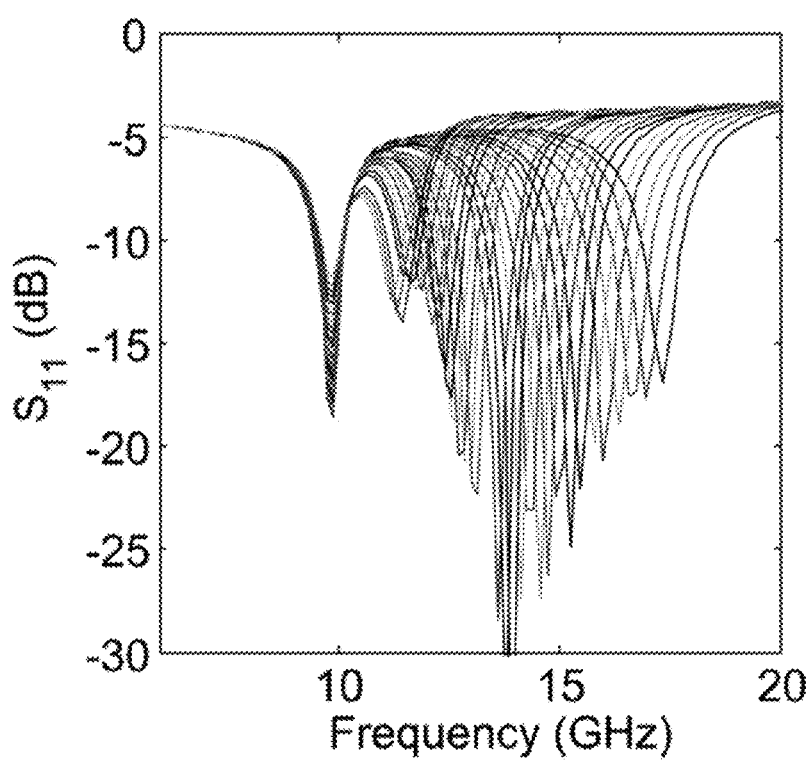
FIG. 13B shows a simulation graph of S11 (reflection) for a TCLNA according to FIG. 8A.

FIG. 13A and FIG. 13B show simulation graphs of AV (gain) (FIG. 13A) and S11 (reflection) (FIG. 13B) versus frequency for the LB (low band) TCLNA in a dual band system with the HB (high band) TCLNA response set to nominal settings. This test showed that both the LB and HB TCLNAs can be properly tuned in an integrated dual band setting.

We turn now to the variable gain amplifier (VGA), such as the VGA of the exemplary receiver of FIG. 2A. A VGA can be used to provide fine tuning of the receiver (Rx) chain gain, another control useful for self healing. When so applying a VGA in a self healing application, VGA specifications such as bandwidth, power consumption, and linearity can be considered. In some embodiments, a VGA having a constant output compression can advantageously provide an output drive capability which is independent of a VGA actuator setting.

Figures 14A, 14B:
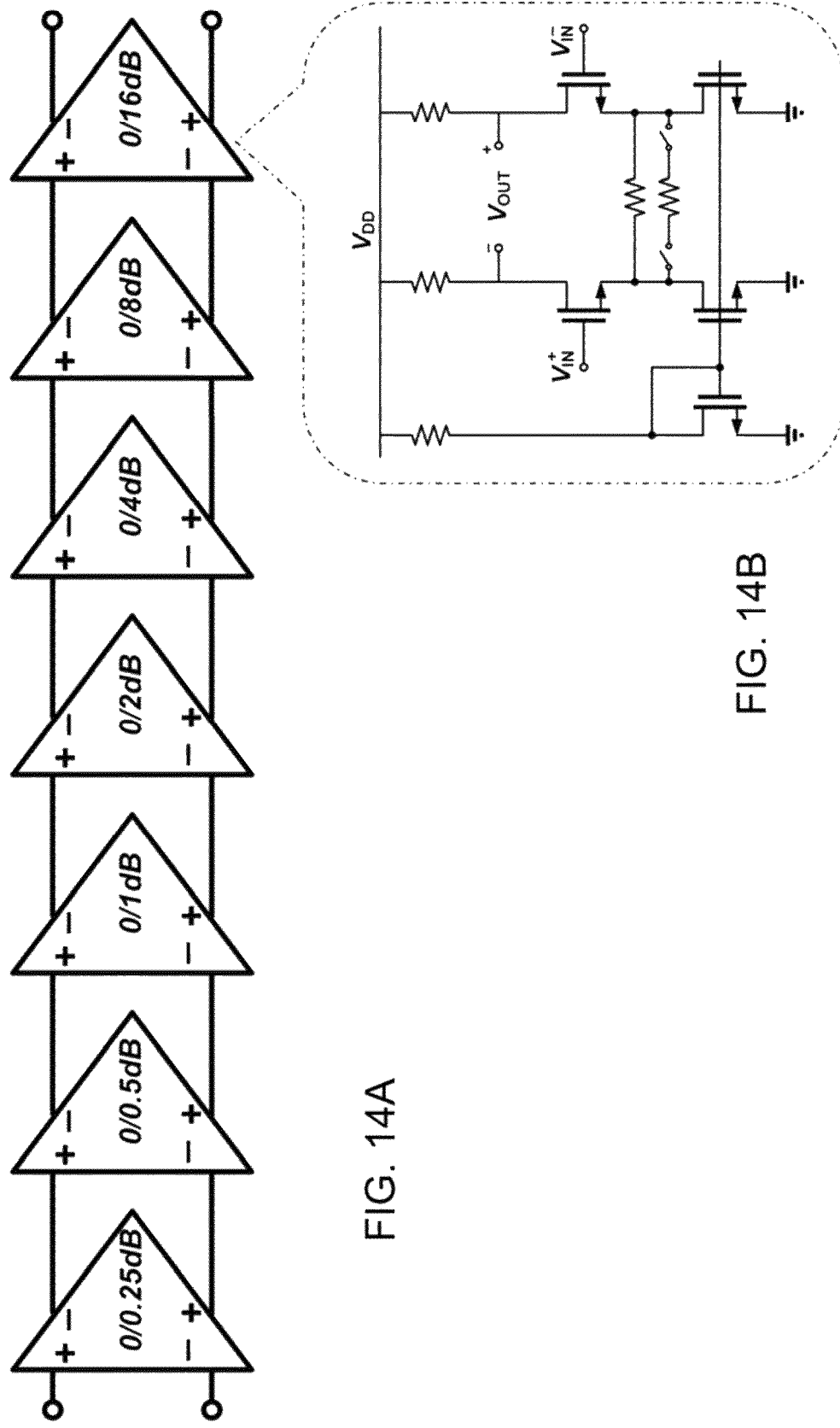
FIG. 14A shows a block diagram of one embodiment of a base band VGA architecture.
FIG. 14B shows an exemplary gain stage schematic diagram for one gain stage of the VGA of FIG. 14A.

FIG. 14A and FIG. 14B show a block diagram (FIG. 14A) and an exemplary gain stage schematic diagram (FIG. 14B) for one suitable type of base band VGA architecture and circuit topology. This exemplary design is based on a variable emitter degeneration which forces the output compression to be constant as a function of gain. In the exemplary embodiment of FIG. 14A, there are seven gain stages, each having a binary weighted gain value. The resistor of each respective gain stage can be switched in or out to enable each particular gain stage. Power dissipation of such a design is expected to be on the order of 30 mW.

Figure 15B:
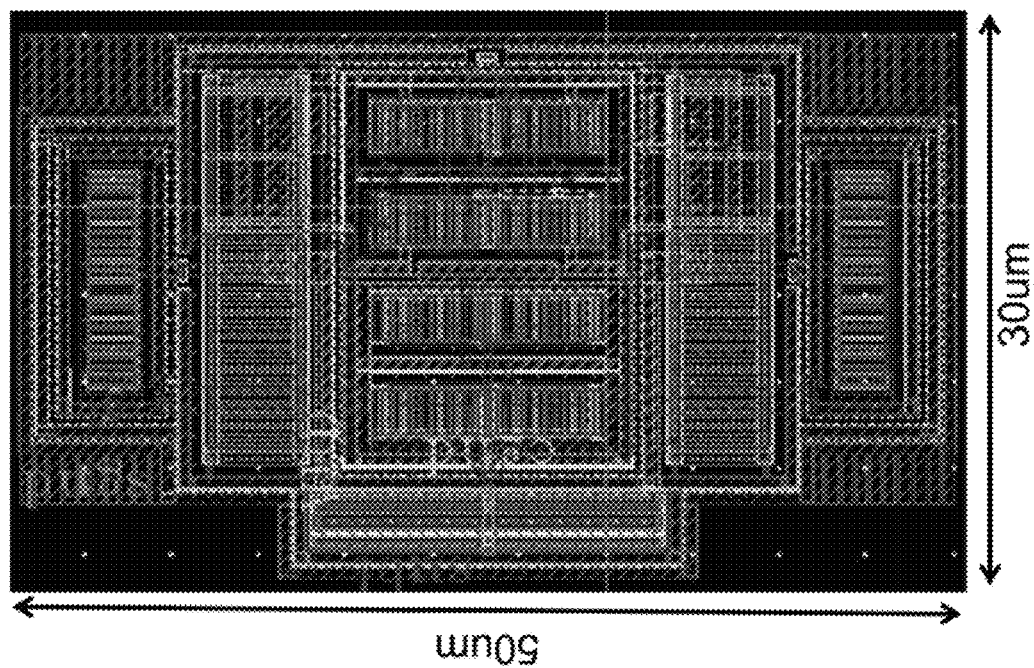
FIG. 15B shows an exemplary layout of a corresponding integrated cell for the VGA gain stage of FIG. 15A.
Figure 15A:
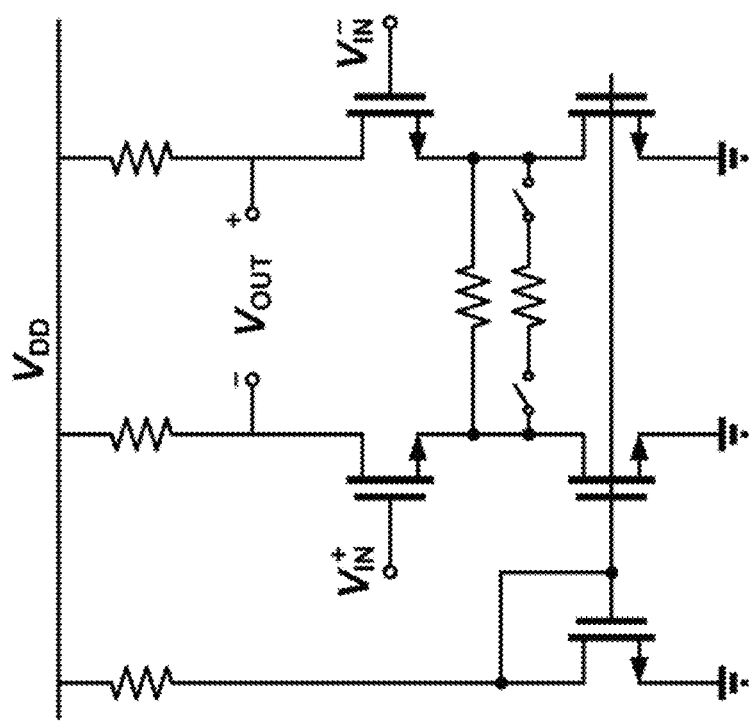
FIG. 15A shows an exemplary schematic diagram of the VGA gain stage of FIG. 14A.

FIG. 15A and FIG. 15B show an exemplary schematic diagram (FIG. 15A) of the exemplary VGA gain stage of FIG.

Figure 16A:
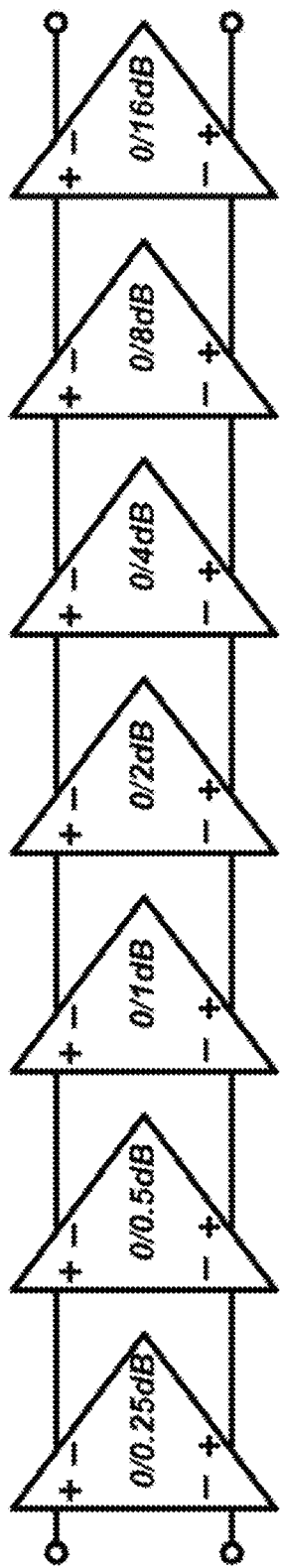
FIG. 16A shows the block diagram of a binary weighted VGA and FIG. 16B shows a corresponding layout inclusive of all of the gain stage cells.
Figure 16B:
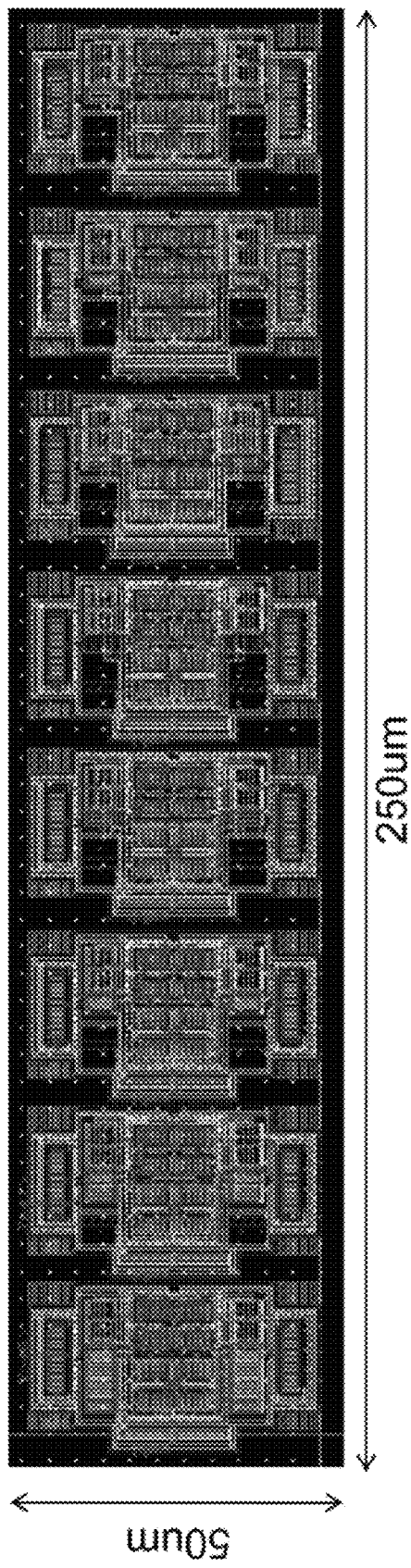
Figure 17:
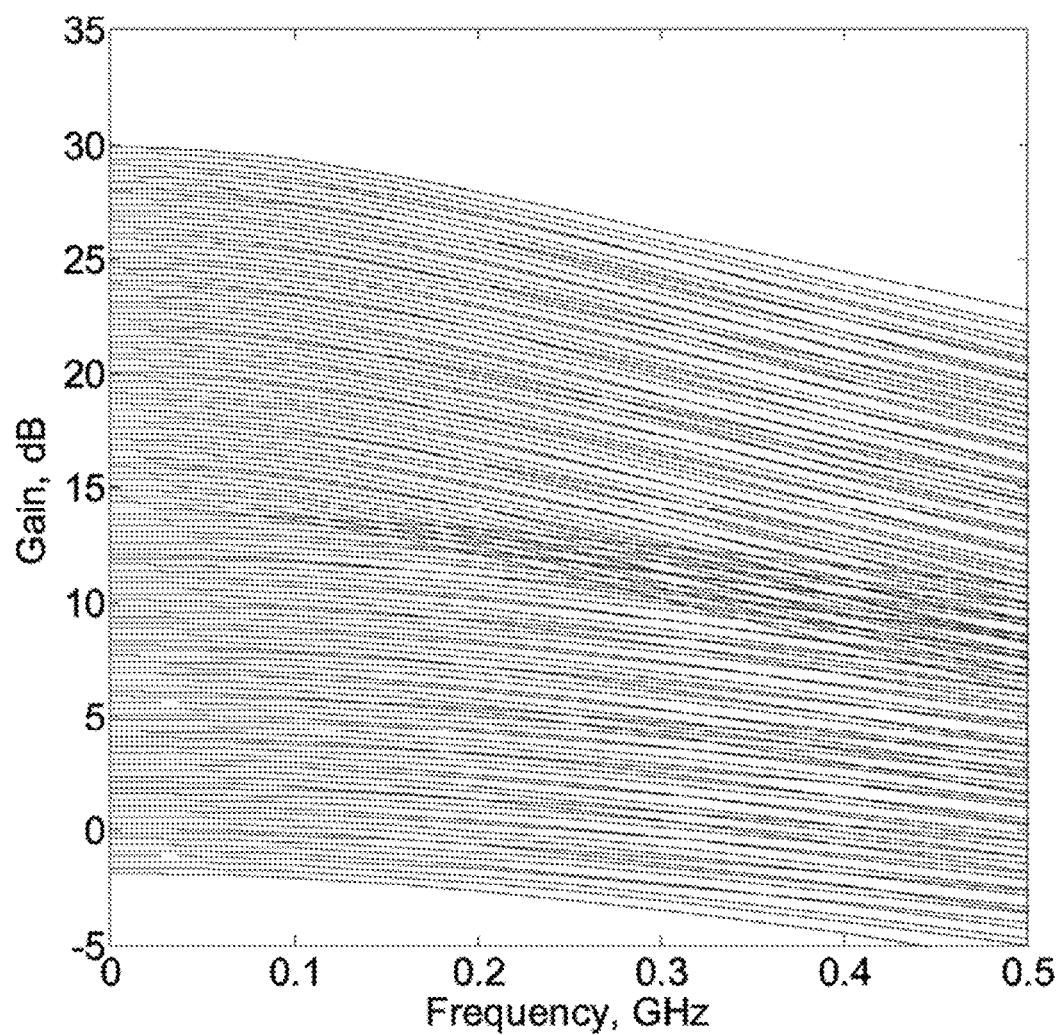
FIG. 17 shows a graph of Gain versus frequency for simulation results for a range of VGA actuator gain settings.

14A and a layout (FIG. 15B) of a corresponding integrated cell. FIG. 16A shows the block diagram of a binary weighted VGA and FIG. 16B shows a corresponding layout inclusive of a plurality of the gain stage cells (the top level wiring that connects the cells and VGA actuator bit I/O connections is not shown in FIG. 16B). FIG. 17 shows a graph of gain versus frequency for simulation results over a range of 7 bits (128 steps) of gain VGA actuator gain settings. FIG. 18 shows a table of Monte Carlo simulation results as mean and sigma values showing deviation from nominal gain for each of the seven stages (for the exemplary 7 bit VGA) (from 500 Monte Carlo simulation runs). It is also contemplated a self healing method could maximize the front end LNA gain and then use a base band VGA actuator setting to flatten the response of a self healing integrated dual conversion RF receiver device.

Figure 19:
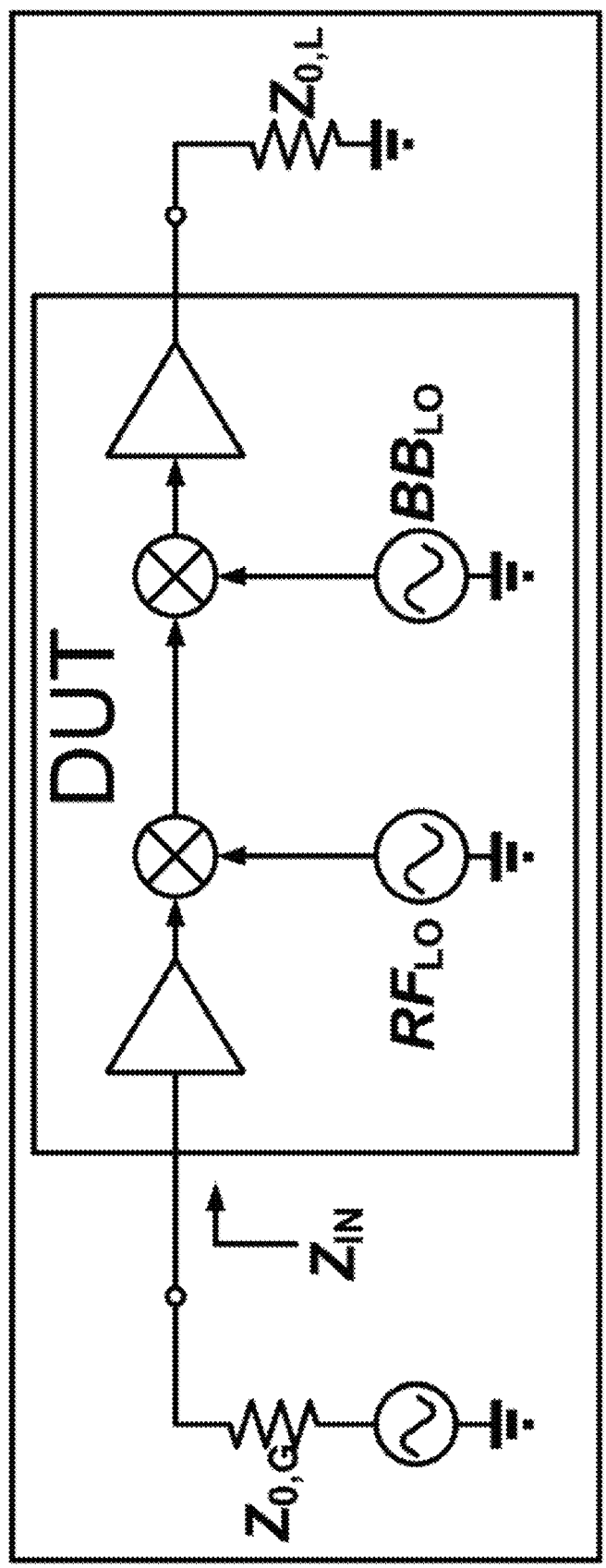
FIG. 19 shows a block diagram of one exemplary self healing integrated dual conversion RF receiver device.

FIG. 19 shows a block diagram of one exemplary self healing integrated dual conversion RF receiver device that can determine a power gain from a test source, typically a 50Ω source, to characterize the receiver. In the embodiment of FIG. 19, power gain, represented by the following equation, $$G = \frac{P_{OUT}}{P_{AV,G}} = 4\frac{Z_{IN}Z_{0,G}}{(Z_{0,G}+Z_{IN})^2}\frac{V_{OUT}^2/Z_L}{V_{IN}^2/Z_{IN}}$$

has been defined with respect to source impedance as advantageous over measuring relative voltage gain to determine relative power (because of the frequency dependence of S11).

Figure 20A:
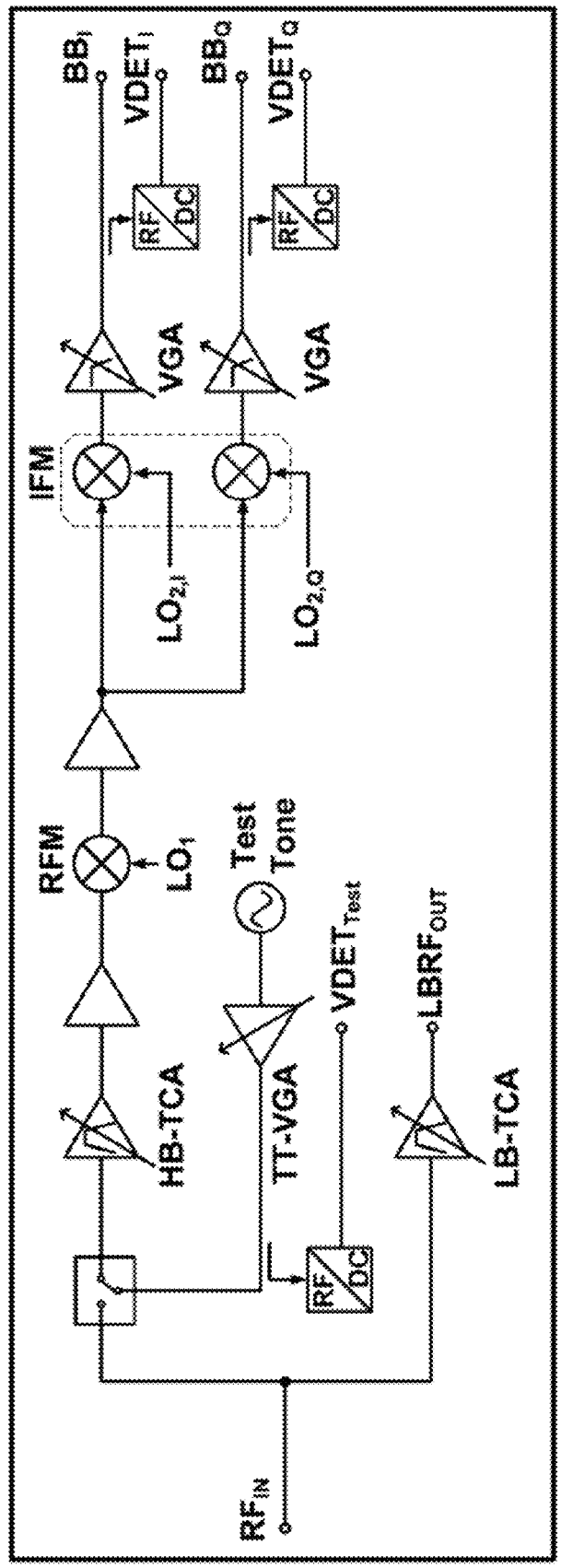
FIG. 20A shows an exemplary block diagram of one half of one embodiment of a dual band self healing integrated dual conversion RF receiver device configured for the CW tone method of self healing.

FIG. 20A shows block diagram of one half of one exemplary embodiment of a dual band self healing integrated dual conversion RF receiver device configured for a CW tone method of self healing. The test tone (a RF test source) is shown in the middle left of the drawing. Voltage detectors used for sensing are shown to the right of the drawing. There are two voltage detectors, $VDET_I$ and $VDET_Q$ for detecting the baseband voltage out from an in-phase (I) baseband channel and a quadrature (Q) baseband channel. The block diagram shows an open loop measurement. If the test tone available power is substantially constant as a function of frequency, flat gain at the input advantageously translates to a flat detected output voltage.

In some embodiments, the loop can be closed and the detector voltage from either the I or Q output or some combination thereof can be used to servo a VGA for constant output power. In other embodiments, e.g., the embodiment of FIG. 4, there can be a settable variable attenuator between a test tone generator and the $AUX_{in}$ to maintain a constant amplitude test signal across a range of test tone frequencies.

Figure 20B:
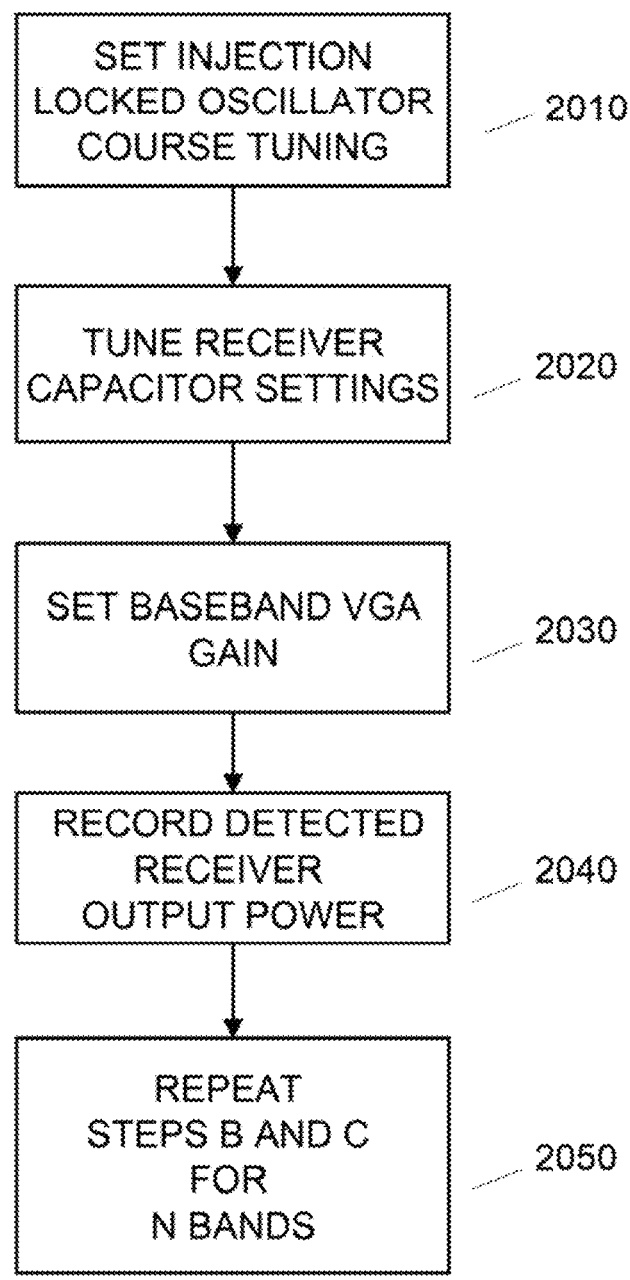
FIG. 20B shows a flow chart illustrating one exemplary method for carrying out a self healing process in a multi-band receiver such as the RF receiver of FIG. 20A.

The flow chart of FIG. 20B shows one exemplary method for carrying out a self healing process in a multi-band self healing integrated dual conversion RF receiver such as the dual band self healing integrated dual conversion RF receiver device of FIG. 20A. In this exemplary embodiment, the highest frequency band can be healed first, followed by the second highest, and so on, such as by using the following process steps: a) an injection locked oscillator coarse tuning voltage is set by letting it free-run (disabling the reference) and maximizing the output power detected at baseband using square law detector (2010), b) the receiver capacitor settings are tuned sequentially (e.g., a $2^{nd}$ stage then a $1^{st}$ stage) using a binary tree search algorithm to find settings that result in a maximum gain (2020), c) with the capacitor settings determined, the baseband VGA is set (2030). For the case of the highest frequency band, the test tone power output can be set arbitrarily to produce a desired receiver output level. Once the baseband VGA is set, the detected output power is recorded and stored (2040). For every other band, the baseband VGA setting is determined as that which minimizes the difference between the detected output for the highest band and that being configured (2050). For example, using an error function, a gradient descent can be used to perform this optimization.

In most embodiments which use the test tone generator method, it is desirable to maintain a test tone generator constant power output over frequency so that the measured sensor signal can be used to find optimal actuator settings, such as by the exemplary methods described herein. One advantageous aspect of the test tone generator method is that while the test tone generator holds substantially constant output power as it sweeps across a frequency range (e.g., by tracking a ⅔ RF LO signal), the sensor makes measurements (e.g., power measurements) at a single baseband frequency. Therefore, since the sensor operates only within a single relatively narrow baseband range, there is no need for the sensor to have a constant broadband (frequency leveled) response over a wide frequency range.

Figure 21:
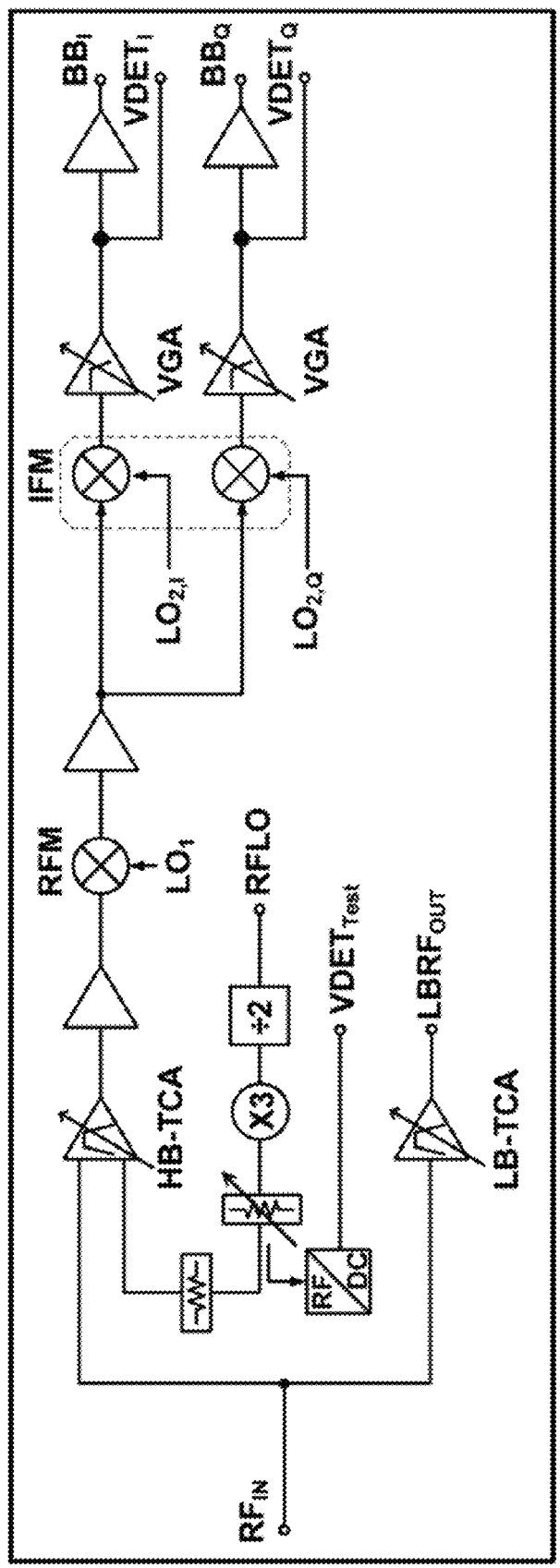
FIG. 21 shows a block diagram of one exemplary implementation of the CW tone method.

FIG. 21 shows a block diagram of one exemplary implementation architecture of the CW tone method. The RF local oscillator (LO) signal at ⅔ $f_{rf}$ is used to generate a test tone at $f_{rf}$. An attenuator is used to provide the 50 ohm output impedance used to emulate an off chip power source. The available power is detected by measuring voltage at an input to the pad, and power can be advantageously leveled using a variable attenuator or an automatic technique (e.g., an AGC loop) as was described hereinabove. The receiver output can then be sensed as a DC level, at a point such as, for example, prior to open collector amplifiers. The IQ phases, available from a reference tone generator, allow for an independent healing of each of the two baseband channels.

Figure 22A:
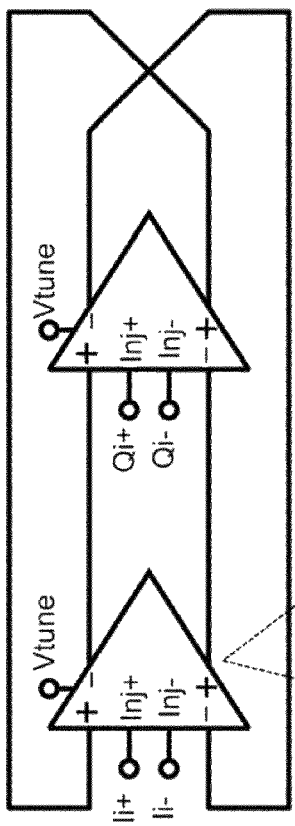
FIG. 22A shows a block diagram of one exemplary injection locked ring oscillator based frequency tripler circuit architecture.
Figure 22B:
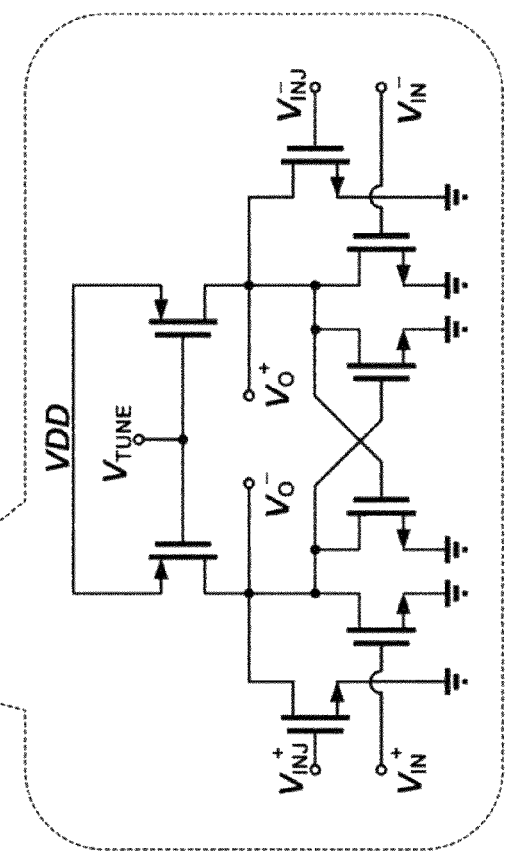
FIG. 22B shows a schematic diagram of an exemplary single stage of a ring oscillator.
Figure 22C:
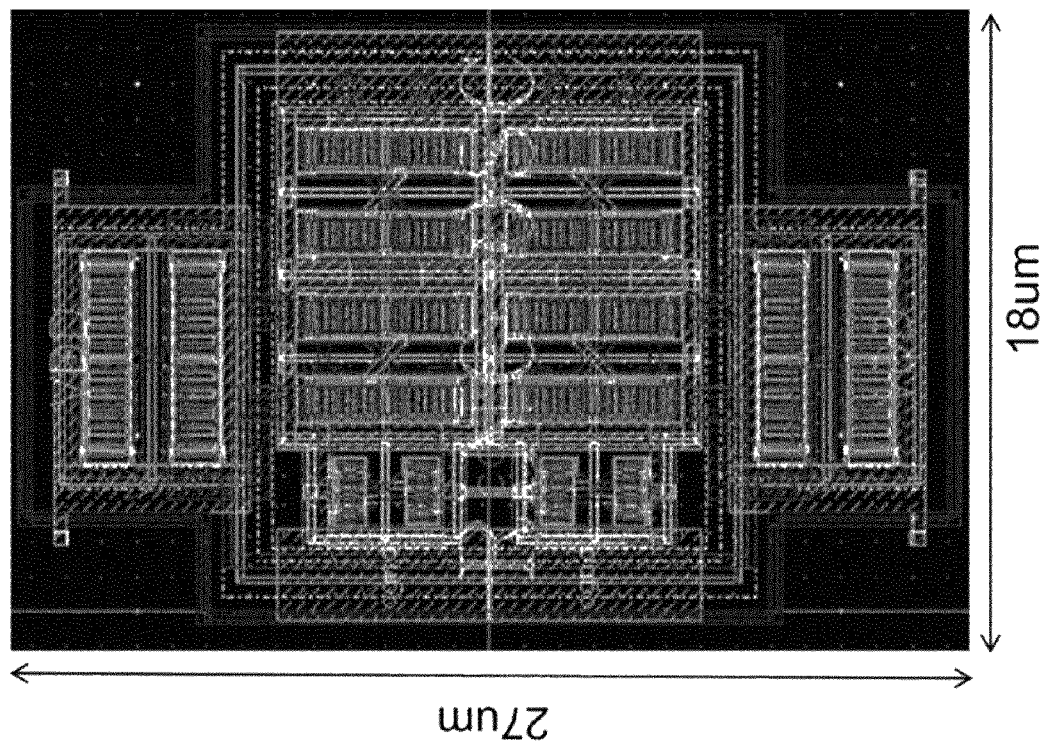
FIG. 22C shows a layout of one stage of a layout for a frequency tripler according to FIG. 22B.

One exemplary frequency tripler (ring oscillator) suitable for use in a CW test tone generator is now described in more detail. FIG. 22A shows a block diagram of one exemplary injection locked oscillator circuit architecture. FIG. 22B shows an exemplary schematic diagram suitable for use as one stage of the frequency tripler. FIG. 22C shows a layout of one stage of the frequency tripler layout according to the schematic diagram of FIG. 22B.

As described hereinabove, a test-tone generator is typically configured to take a first LO signal, to convert it to an RF frequency, and to deliver a constant available power at a level suitable for measurement to a receiver under test. In some embodiments, the test tone generator can be disabled when not in use, thereby saving power. In one exemplary embodiment, a test tone generator includes sequentially: a) a frequency divider, b) an injection locked frequency tripler which provide IQ phases as output, c) an injection locked clean up oscillator which provides IQ phases as output and reduces sub-harmonic content, d) an I/Q switch, and e) a servo controlled attenuator which levels the power and reduced the drive to that suitable for a LNA (typically, nano Watts or below).

Figure 23B:
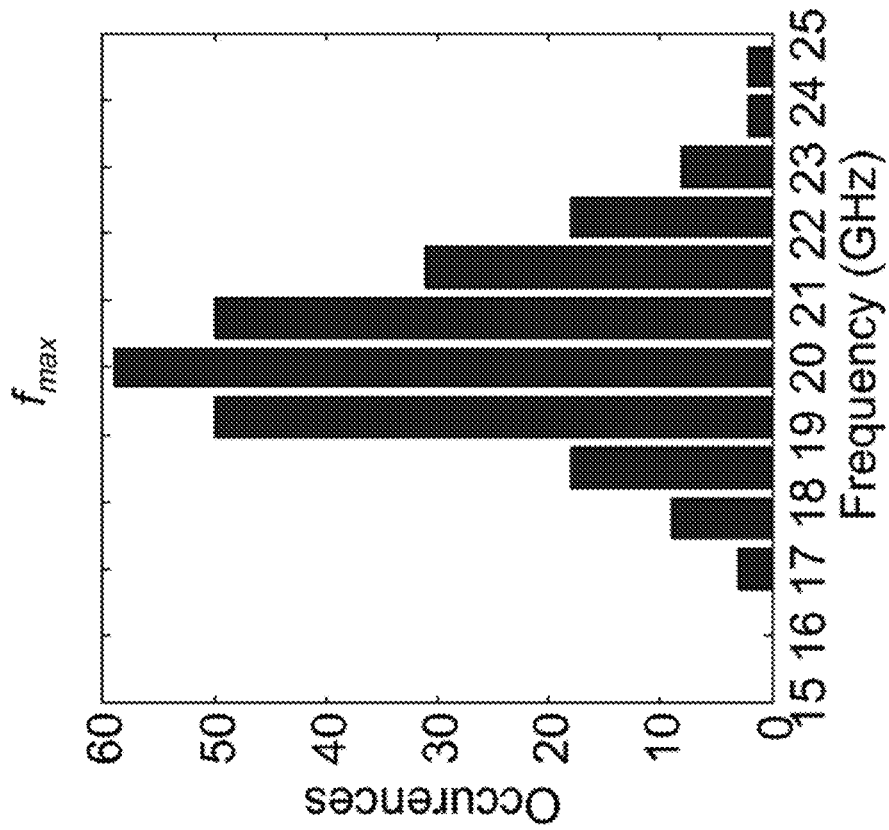
FIG. 23B shows a histogram of free-running frequency occurrences for a Monte Carlo simulation of the ring oscillator circuit at a fixed control setting.
Figure 23A:
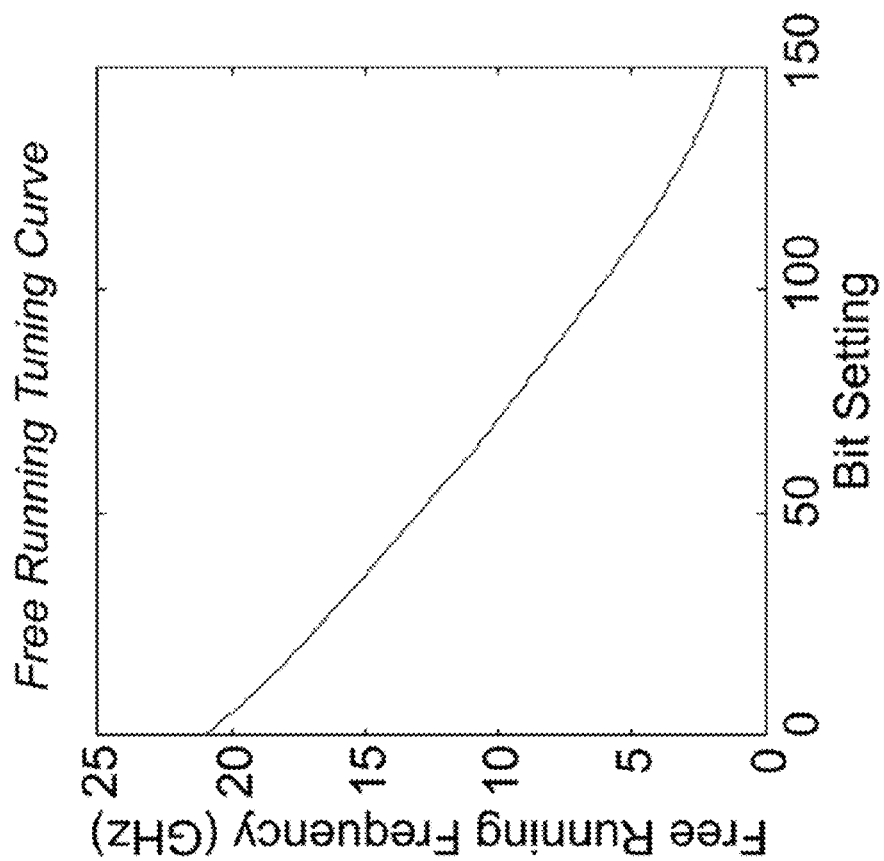
FIG. 23A shows a graph of free running frequency plotted versus bit settings.

FIG. 23A shows a graph of a free running tuning curve of an injection locked oscillator as free running frequency plotted versus bit settings. FIG. 23B shows a histogram of occurrences in frequency bins with an $f_{max}$ at the center of the histogram. The power dissipation of this exemplary injection locked ring-oscillator was calculated to be less than about 24 mW.

Figure 24A:
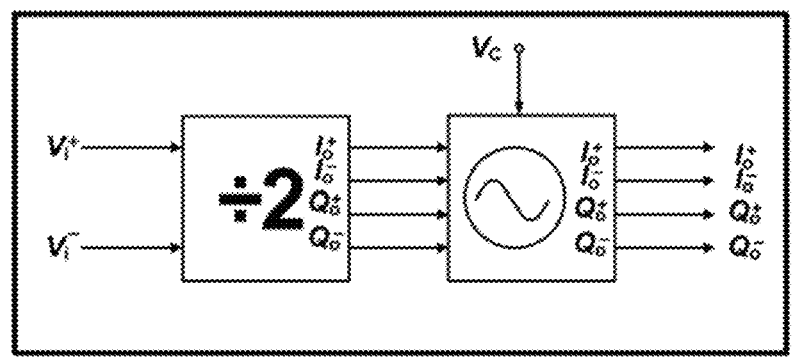
FIG. 24A shows a block diagram of an exemplary combination of a frequency divider and a ring-oscillator serving as a 3/2 frequency multiplier.
Figure 24B:
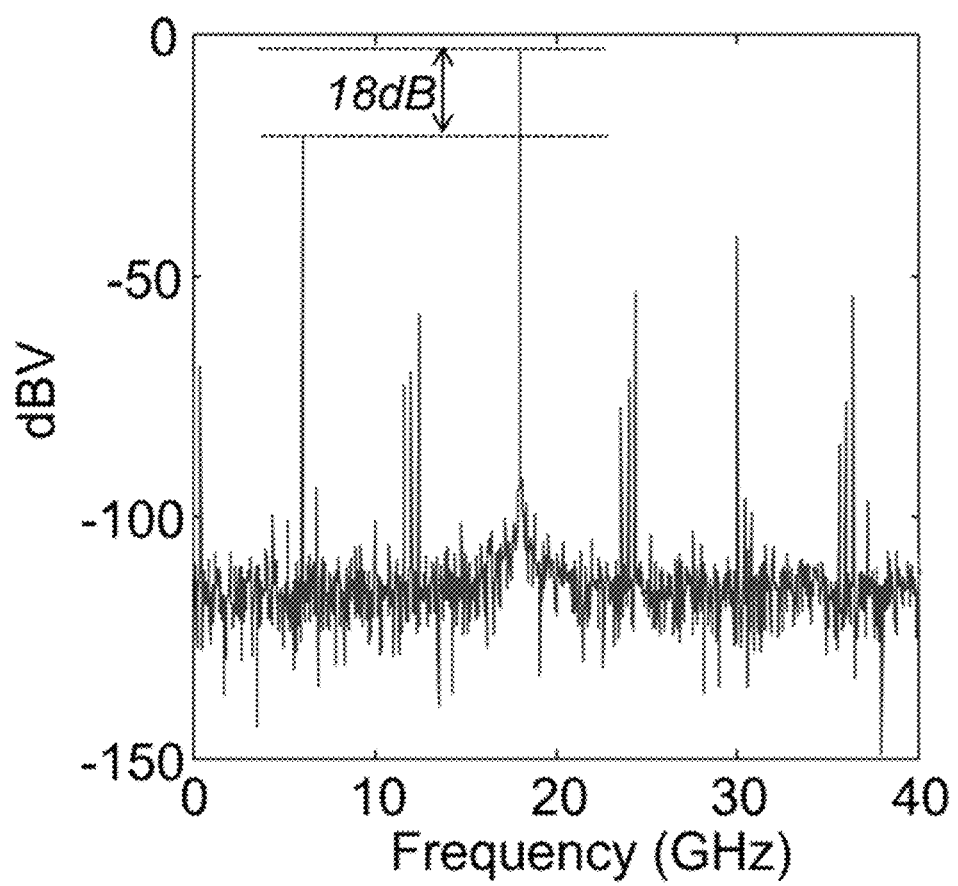
FIG. 24B shows a spectrum of the ring oscillator output of FIG. 24A.
Figure 25A:
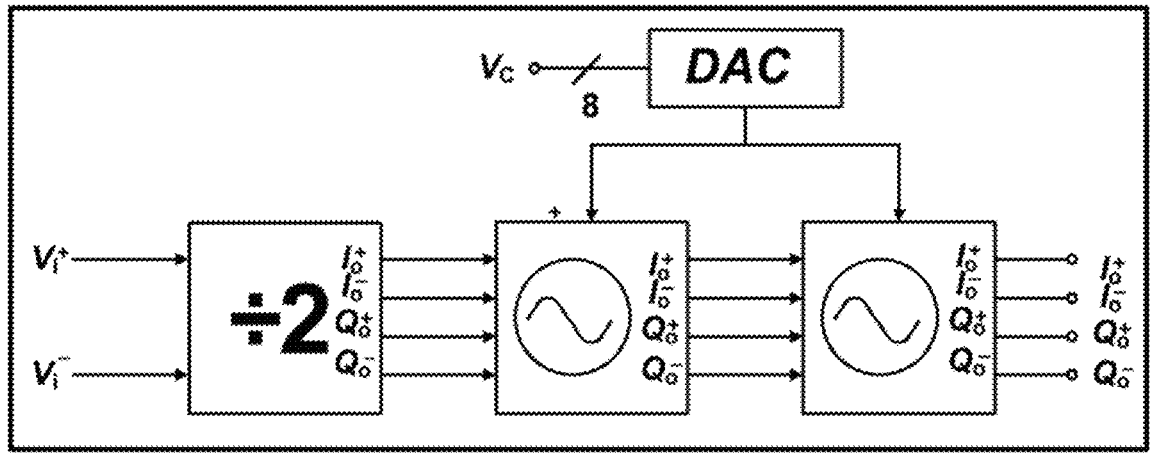
FIG. 25A shows a block diagram of one such CW tone generator having two injection locked oscillators.
Figure 25B:
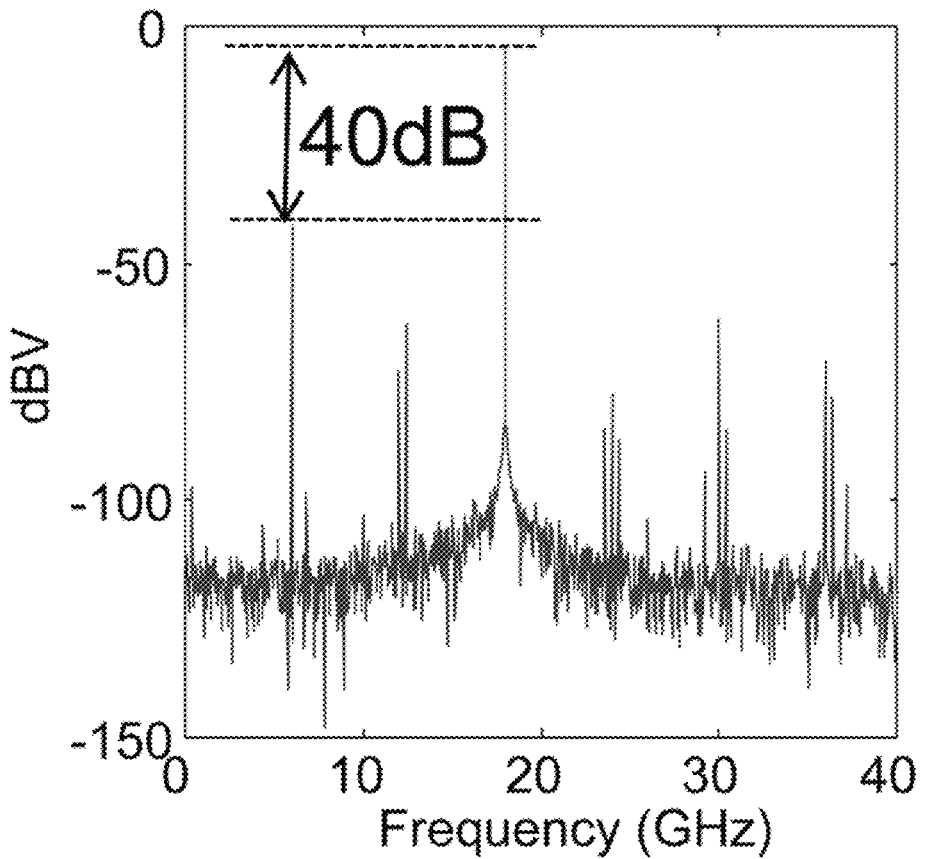
FIG. 25B shows a spectrum of improved suppression of the sub-harmonic signals for the CW tone generator of FIG. 25A.

FIG. 24A shows a block diagram of the exemplary injection locked ring-oscillator and FIG. 24B shows a spectrum of the ring oscillator output plotted as dBV (output) versus frequency. It can be seen that in this embodiment, at least one of the subharmonics is within about 18 dB of the desired fundamental frequency. We found there is a direct tradeoff between locking range and sub-harmonic rejection. Thus, we were able to improve the amplitude separation to 40 dB (fundamental over close-in subharmonics) by the addition of an additional injection oscillator. FIG. 25A shows a block diagram of one such CW tone generator having two injection locked oscillators. FIG. 25B shows a spectrum of DBV versus frequency illustrating the improved 40 dB suppression of the sub-harmonic signals by use of the CW tone generator architecture of FIG. 25A. In this embodiment, the frequency tripler is followed by a fundamental injection locked oscillator which rejects sub-harmonic components. Both injection locked oscillators have the same circuit topology and align frequency tuning curves in the same way. The quadrature outputs allow for determination of gain.

Figure 26:
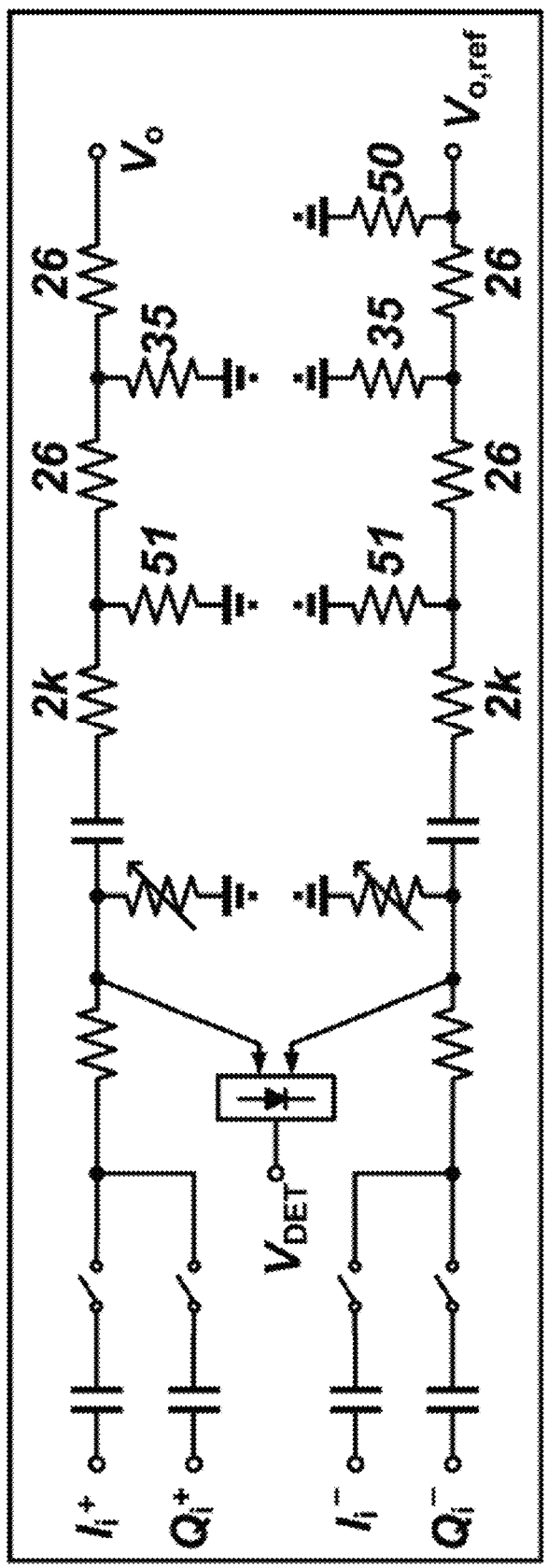
FIG. 26A shows a schematic diagram of exemplary signal coupling suitable for CW tone generation.

FIG. 26A shows a schematic diagram one embodiment of signal coupling related to CW tone generation. The output $V_{o,ref}$ can optionally be used to measure S11 signal matching.

Figure 27B:
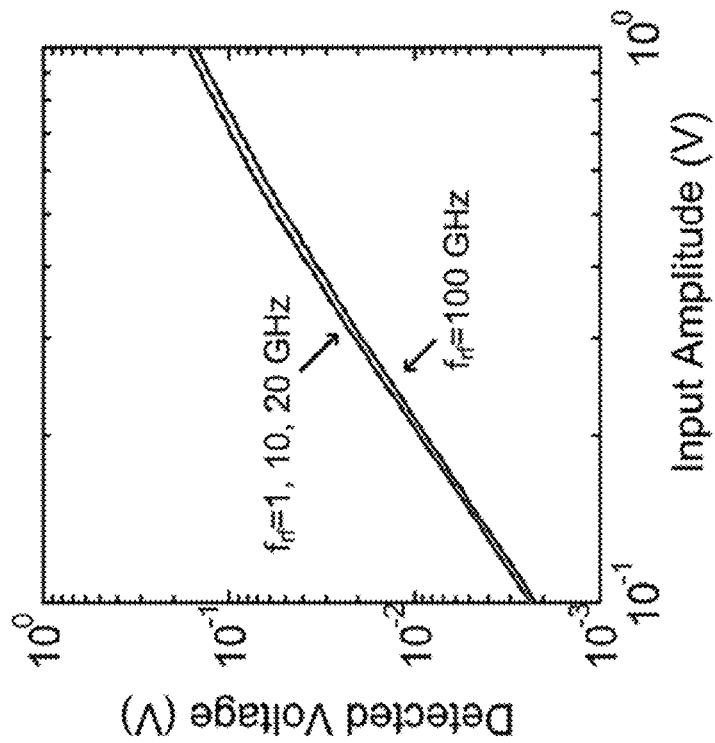
FIG. 27B shows a graph of detected voltage plotted versus signal amplitude for the RF power sensor of FIG. 27A.
Figure 27A:
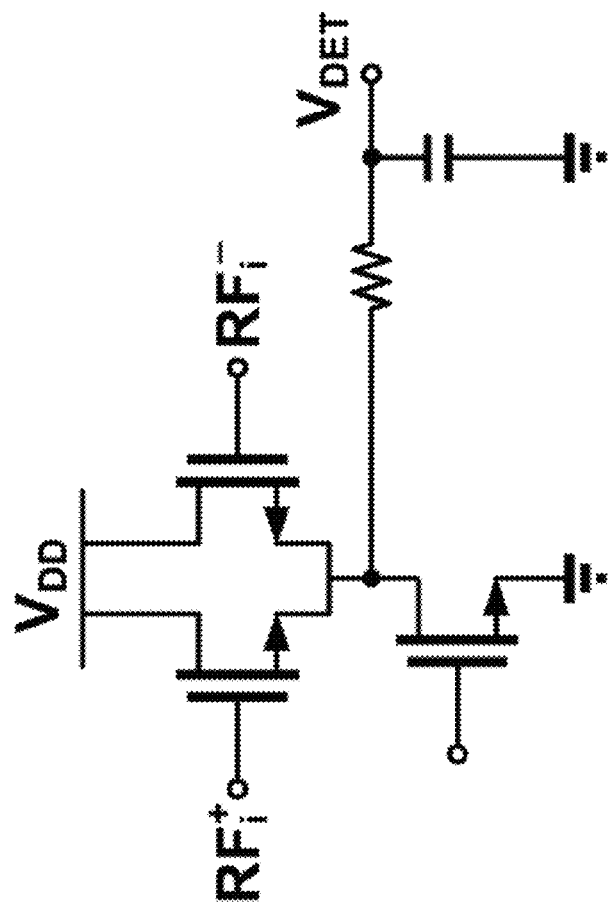
FIG. 27A shows a schematic diagram of an exemplary RF power sensor.

FIG. 27A shows an RF power sensor useful for generating a CW tone having a flat test tone power output with frequency. FIG. 27B shows a graph of detected voltage plotted versus signal amplitude.

Figure 28A:
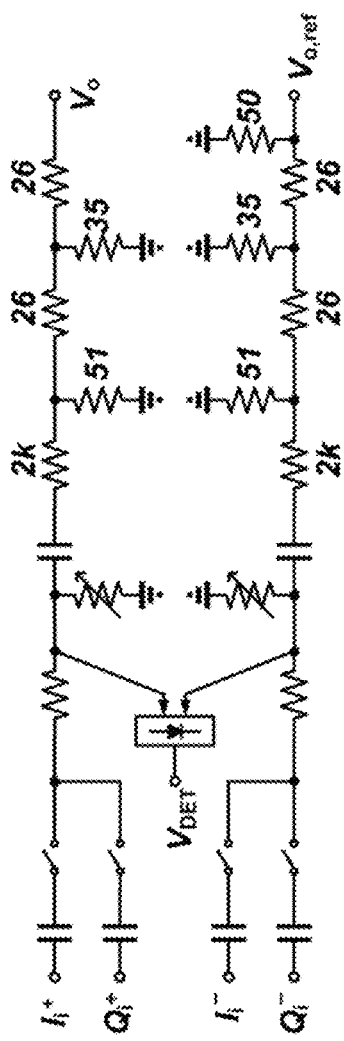
FIG. 28A shows an exemplary CW tone generator coupling network.
Figure 28C:
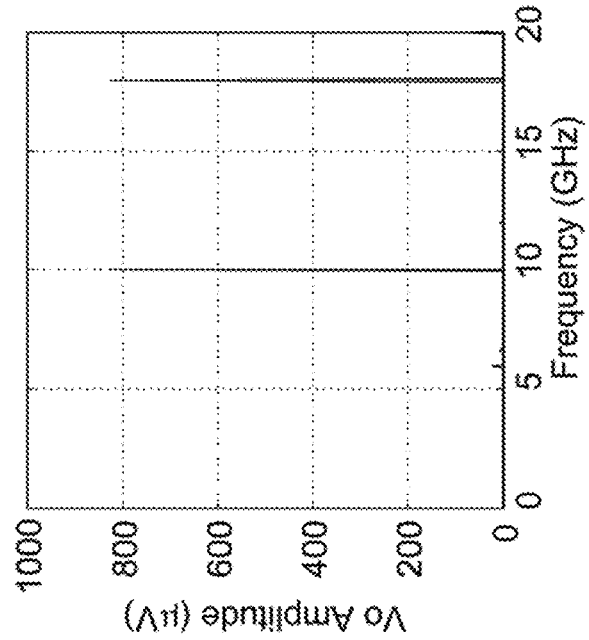
FIG. 28C shows a spectrum of the two tones of FIG. 28B.
Figure 28B:
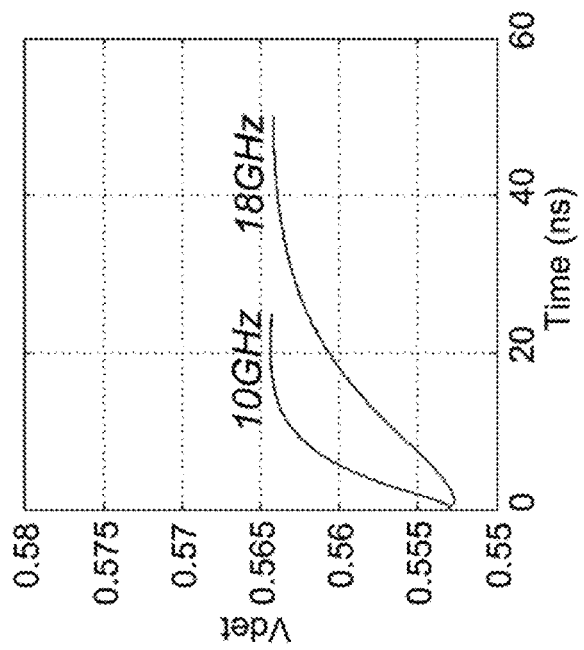
FIG. 28B shows a graph of detected voltage versus time for two tone frequencies.

FIG. 28A shows an exemplary CW tone generator coupling network. FIG. 28B shows a graph of detected voltage versus time for two tone frequencies which shows that when enabled, the test tone can reach a constant amplitude output very quickly. FIG. 28C shows a spectrum of the two tones of FIG. 28B.

Figure 29:
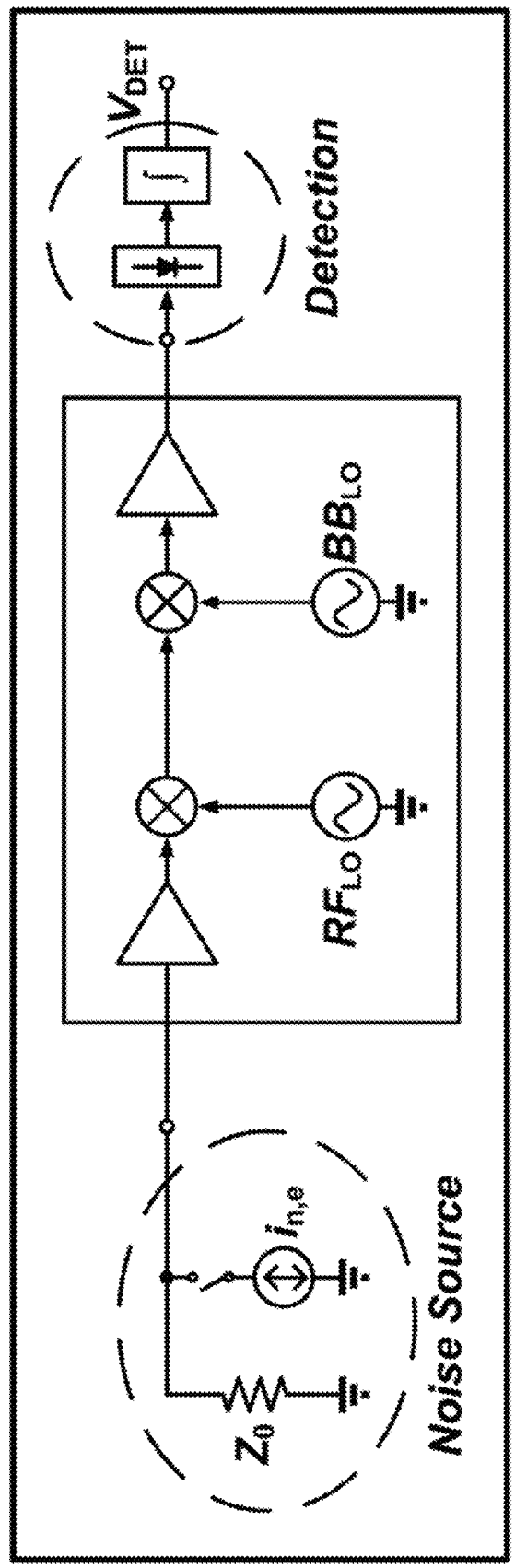
FIG. 29 shows a block diagram of an exemplary self healing integrated dual conversion RF receiver using a noise source.

FIG. 29 shows a self healing integrated dual conversion RF receiver using a noise source instead of a CW tone source. The noise source can have two states:

$$T_{COLD} = T_a \qquad T_{HOT} = T_a\left(1 + \frac{\overline{|i_{n,e}|^2}}{4k}\text{R}\{Z_G\}\right) = T_a + T_{ENR}$$

$$E\{V_{DET,cold}\} \approx \alpha G_{RX}(T_a + T_{RX}) \qquad E\{V_{DET,hot}\} \approx \alpha G_{RX}(T_a + T_{ENR} + T_{RX})$$

$$\sigma\{V_{DET,cold}\} \approx \frac{\alpha G_{RX}(T_a + T_{RX})}{\sqrt{B_{BB}\tau}} \qquad \sigma\{V_{DET,hot}\} \approx \frac{\alpha G_{RX}(T_a + T_{ENR} + T_{RX})}{\sqrt{B_{BB}\tau}}$$

$\alpha$ is frequency independent and relates the detected voltage to the actual power. $T_{ENR}$ represents excess noise as temperature above 300 K. The relative gain measurement is given by the delta of the hot and cold temperatures:

$$E\{V_{DET,hot} - V_{DET,cold}\} \approx \alpha G_{RX} T_{ENR}$$

If $T_{ENR}$ is independent of frequency, the measured change in $V_{DET}$ will be constant, and the value $T_{ENR}$ is not needed to determine relative gain. Integration time can be determined by theoretical fluctuations in detected output:

$$\sigma\{V_{DET,hot} - V_{DET,cold}\} \approx \sqrt{\frac{(T_a + T_{RX})^2 + (T_a + T_{ENR} + T_{RX})^2}{B_{BB}\tau}}$$

$$\tau_{n\sigma} = n^2 \frac{(T_a + T_{ENR} + T_{RX})^2 + (T_a + T_{RX})^2}{B_{BB} T_{ENR}^2 (10^{\gamma/10} - 1)}$$

Figure 30:
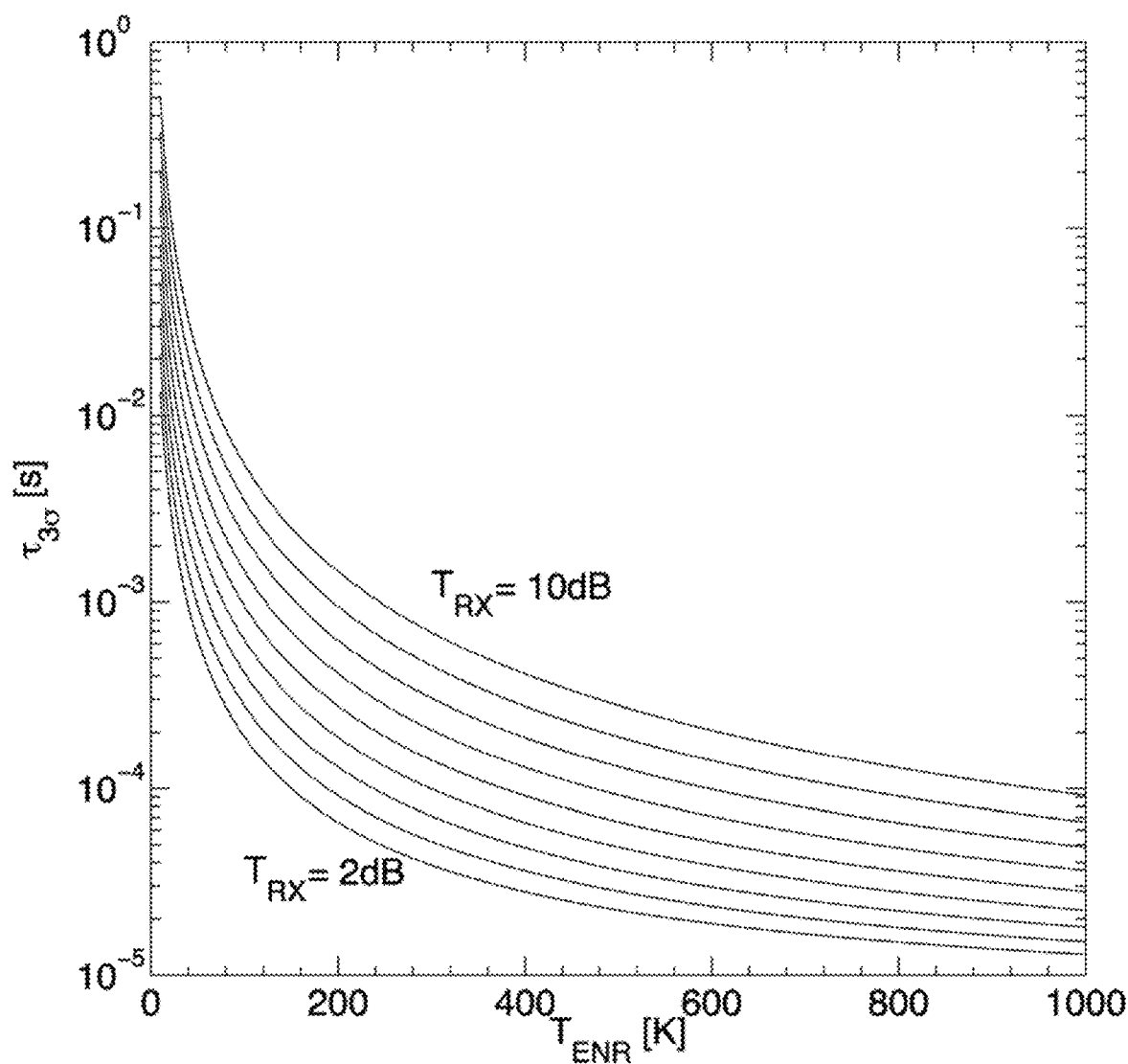
FIG. 30 shows a graph of $\tau_{3\sigma}$ versus $T_{ENR}$

FIG. 30 shows a graph of $\tau_{3\sigma}$ versus $T_{ENR}$ for a +/−0.5 dB error in the measurement.

Figure 31:
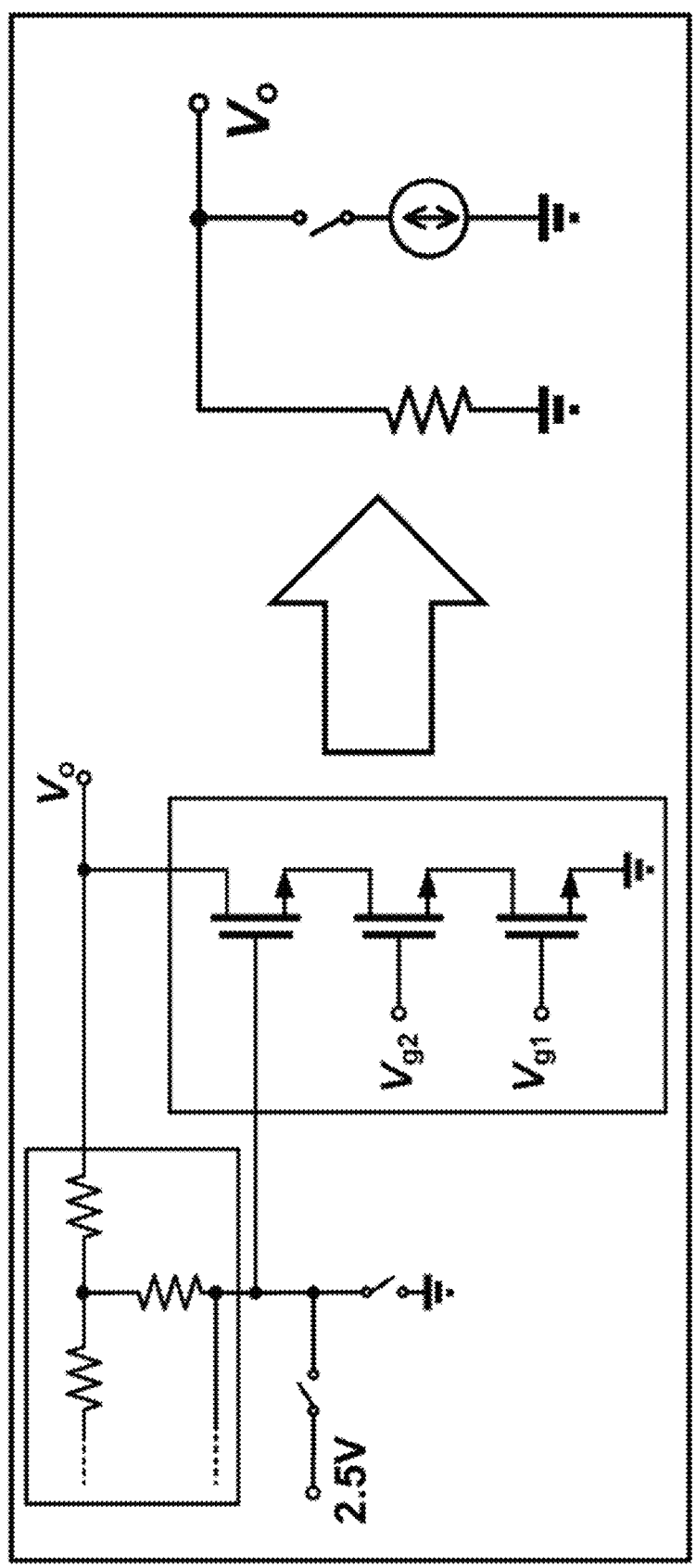
FIG. 31 shows an exemplary noise source.

FIG. 31 shows one exemplary implementation of a noise source based gain sensing circuit topology. In this embodiment, a variable ENR source was created by putting a triple cascoded device in parallel with an attenuator output. This three transistor stack advantageously provides a relatively high output impedance, while maintaining a 50 ohm source at the attenuator. The top transistor of the triple cascode can serve as a switch. Power dissipation was estimated to be about 10 mW for this exemplary noise source. Those skilled in the art will understand that while we have described one exemplary cascode transistor noise source, any other suitable type of noise source can be used.

Figure 32:
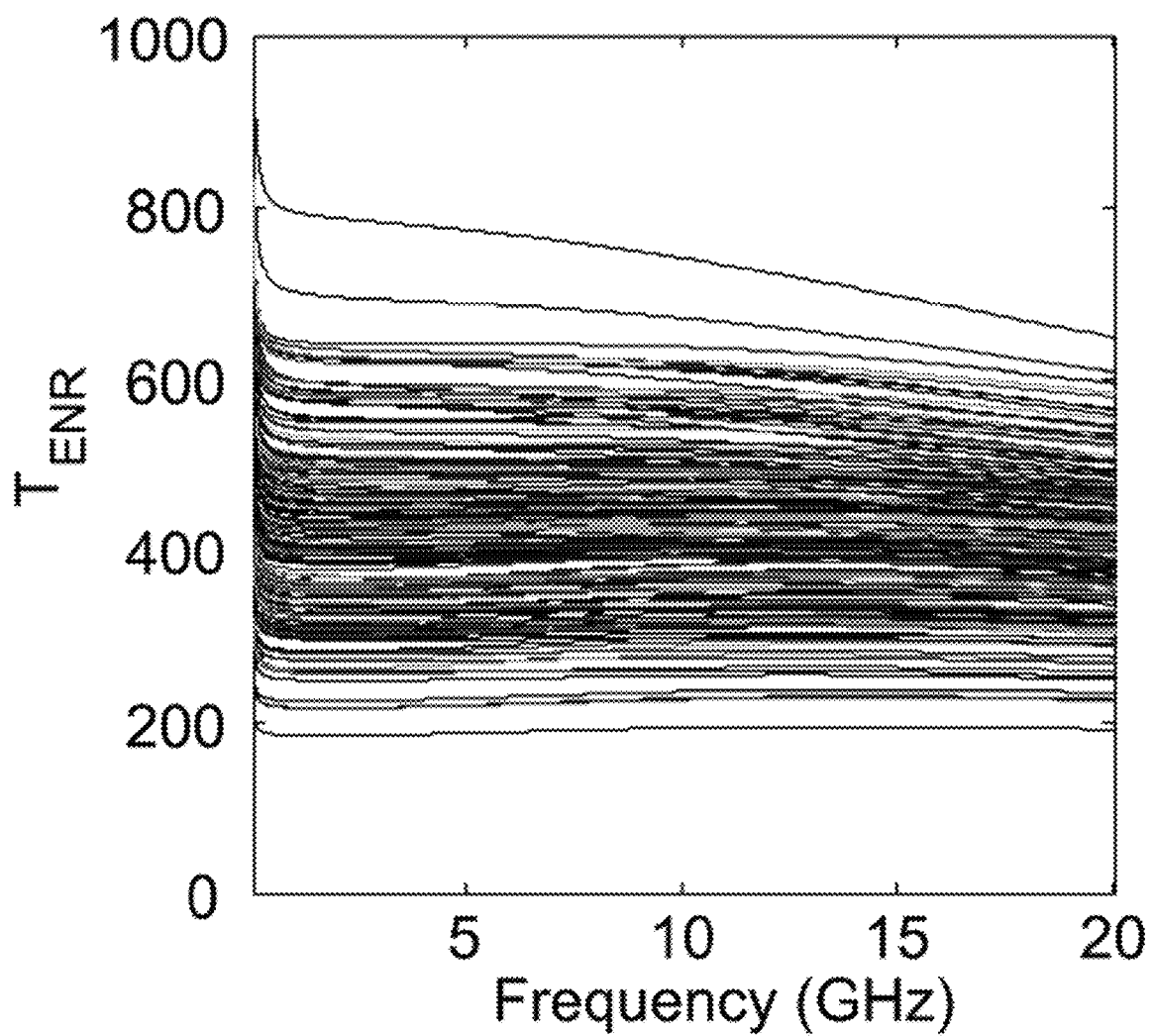
FIG. 32 shows a graph of $T_{ENR}$ versus frequency for 200 exemplary Monte Carlo simulations.

FIG. 32 shows a graph of $T_{ENR}$ versus frequency for 200 exemplary Monte Carlo simulations. We found that while the absolute value of $T_{ENR}$ is process dependent, a slope of much better than 3 dB was achieved over a 6-20 GHz frequency range for all of our fabricated samples.

Figure 33:
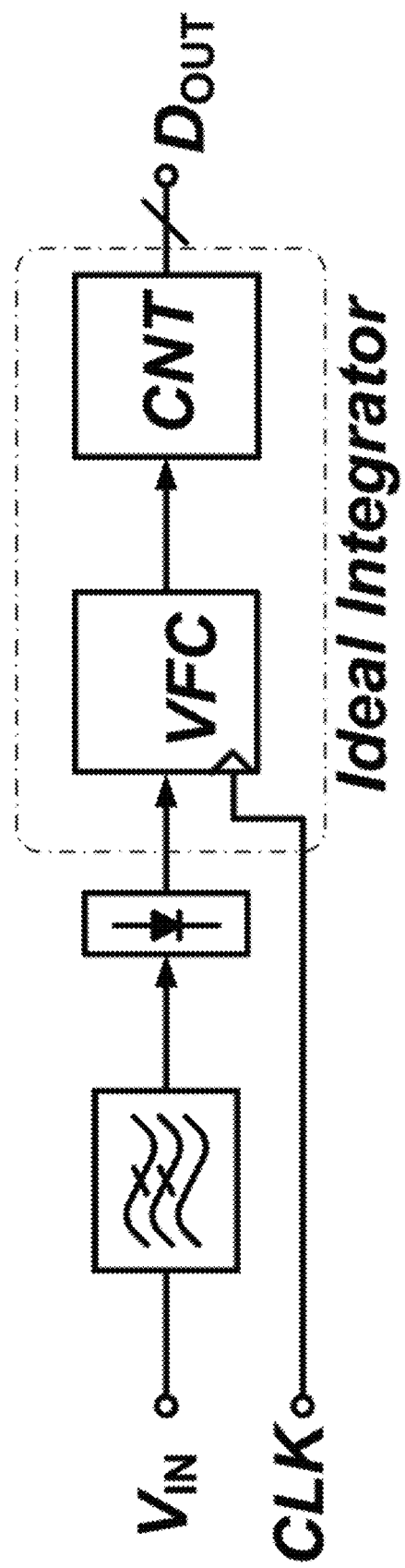
FIG. 33 shows a block diagram of one embodiment of baseband processing for use with a noise based test source.

FIG. 33 shows a block diagram of baseband processing in one embodiment of a noise based gain sensing hardware architecture. A sharp lowpass filter ($G_m$-C) defines the noise bandwidth. The detector squares the white noise spectrum. An integrator produces a digital output. One suitable type of integrator is called an "ideal integrated" which is based on a VFC (voltage to frequency converter) followed by a digital counter.

Theoretical Discussion—Noise Source

Figure 34:
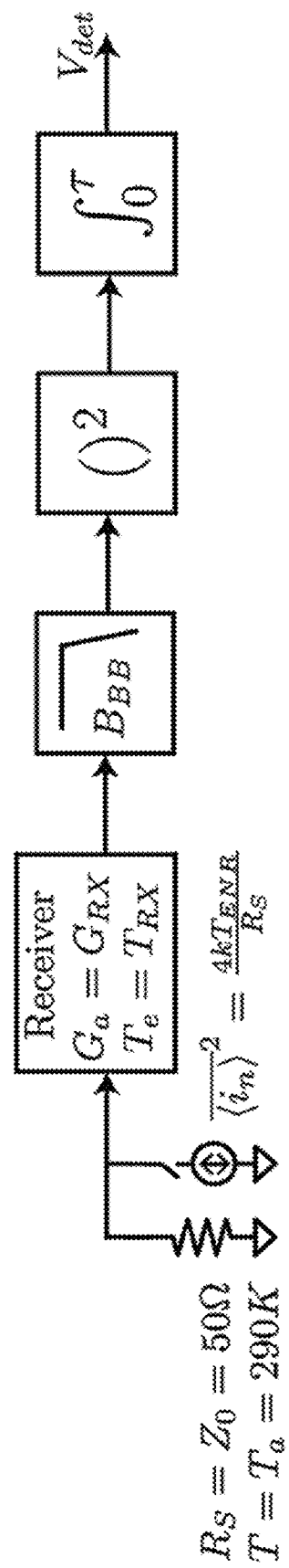
FIG. 34 shows a block diagram of a noise based measurement system.

Referring to the block diagram of a radiometer based gain sensing system of FIG. 34, a derivation of integration times useful for a radiometer based relative gain measurement is now described. The system is excited by a current noise source in parallel with a termination resistance. When the noise current source is in the off state, the input of the receiver under test is terminated in a 50 μl resistor at ambient temperature, so the white noise power available in a 1 Hz bandwidth at the input of the receiver is given as $$P_{av,cold} = kT_a. \qquad (1)(1)$$

This power is amplified and downcoverted by the receiver before being band-limited and then detected at baseband. Finally, the detected power is averaged over an integration time, τ to give a DC voltage, $V_{det}$, which has an expected value of $$E\{V_{det}(\text{cold})\} = \alpha G_{RX}(T_a + T_{RX}), \qquad (2)$$

where α is a proportionality constant, $G_{RX}$ and $T_{RX}$ are the available gain and input-referred noise temperature of the receiver under test and $B_{BB}$ is the bandwidth of the baseband lowpass filter. Similarly, the standard deviation in the observed voltage is given as $$\sigma\{V_{det}(\text{cold})\} = \frac{\alpha G_{RX}(T_a + T_{RX})}{\sqrt{B_{BB}\tau}}, \qquad (3)$$

where τ is the integration time for the measurement and $B_{BB}$ is the brick-wall bandwidth over which the noise is detected.

When the noise source is switched on, the white noise power available from the generator in a 1 Hz bandwidth is given as $$P_{av,hot} = k(T_a + T_{ENR}). \qquad (4)$$

Thus, the detected voltage has an expectation and standard deviation of $$E\{V_{det}(\text{hot})\} = \alpha G_{RX}(T_a + T_{ENR} + T_{RX}), \text{ and} \qquad (5)$$

-continued $$\sigma\{V_{det}(\text{hot})\} = \frac{\alpha G_{RX}(T_a + T_{ENR} + T_{RX})}{\sqrt{B_{BB}\tau}}. \tag{6}$$

Now, referring to equations (2) and (5), we find that the expectation of the difference in detected voltages between the hot and cold states is given as $$E\{V_{det}(\text{hot}) - V_{det}(\text{cold})\} = \alpha G_{RX} T_{ENR}. \tag{7}$$

Referring to equation (7), we see that difference in detected voltages is directly proportional to the gain of the receive chain. Moreover, we see that if $T_{ENR}$ is independent of frequency (i.e., the noise source exciting the system is truly a white noise source), then the only frequency dependence in $E\{V_{det}(\text{hot}) - V_{det}(\text{cold})\}$ is in the receiver gain. Thus, if the observed quantity $V_{det}(\text{hot}) - V_{det}(\text{cold})$ is kept constant as the center frequency of the receiver is tuned, then the available power gain of the receiver system must be frequency independent and this measurement system can be used to characterize and correct gain variation in an RF receiver.

However, as the stimulus source is a white noise source that is detected at baseband, there will be some intrinsic fluctuations in the dc voltage. From equations (3) and (6), the standard deviation in the observed difference is given as $$\sigma\{V_{det}(\text{hot}) - V_{det}(\text{cold})\} = \tag{8}$$

$$\alpha G_{RX}\sqrt{\frac{(T_a + T_{ENR} + T_{RX})^2 + (T_a + T_{RX})^2}{B_{BB}\tau}}.$$

Thus, the integration time required to ensure that the n standard deviation of the measurement (n$\tau$) is equal to $\gamma$ dB is given as $$\tau_{n\sigma} = n^2 \frac{(T_a + T_{ENR} + T_{RX})^2 + (T_a + T_{RX})^2}{B_{BB} T_{ENR}^2 (10^{\gamma/10} - 1)} \tag{9}$$

As two measurements are required, each gain calculation takes $2\tau_{n\sigma}$.

DEFINITIONS

Recording the results from an operation or data acquisition, such as for example, recording results for a particular self healing operation, is understood to mean and is defined herein as writing output data in a non-transitory manner to a storage element, to a machine-readable storage medium, or to a storage device. Non-transitory machine-readable storage media that can be used in the invention include electronic, magnetic and/or optical storage media, such as magnetic floppy disks, hard disks, solid state drives (SSD); a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, ExpressCard cards or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. Unless otherwise explicitly recited, any reference herein to "record" or "recording" is understood to refer to a non-transitory record or a non-transitory recording.

As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing an image to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example instructions for data processing coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein, so long as at least some of the implementation is performed in hardware.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An integrated RF device comprising:
    at least one RF amplifier configured to be electrically coupled at a first time simultaneously to both of, and at a second time alternatively to a selected one of, an RF signal input and an auxiliary input, said auxiliary input having an RF test source switchably connected thereto;
    a first mixer stage including a first local oscillator, said first mixer stage electrically coupled to said at least one RF amplifier, said first mixer stage having a second switchable feedback connection to said at least one RF amplifier by way of said auxiliary input;
    at least one second mixer stage including a second local oscillator, said at least one second mixer stage electrically coupled to said first mixer stage;
    at least one baseband amplifier electrically coupled to said second mixer stage, said at least one baseband amplifier having at least one base band output terminal;
    at least a selected one of said RF amplifier and said baseband amplifier having at least one actuator and at least one actuator terminal configured to provide an actuator setting; and
    at least one terminal configured to receive an electrical voltage to power said integrated RF device.

2. The integrated RF device of claim 1, further comprising a processor configured to perform a computation and having as input a sensor configured to provide a parameter measured while said RF amplifier is electrically coupled to said RF test source, said computation configured to generate at least one self healing calibration setting of said at least one actuator to cause a gain calibration of a self healing dual conversion RF receiver.

3. The integrated RF device of claim 2, wherein said self healing dual conversion RF receiver is disposed on a single semiconductor substrate with said integrated RF device.

4. The integrated RF device of claim 2, wherein said device is fabricated in a CMOS process.

5. The integrated RF device of claim 2, wherein said at least one actuator is configured to set a gain as a function of frequency.

6. The integrated RF device of claim 2, wherein said gain calibration of said integrated RF receiver is configured to compensate for a variation selected one of a fabrication process variation, a variation in said self healing dual conversion RF receiver due to operational use including aging, and a variation in an ambient environmental factor including a temperature, a pressure, and a humidity.

7. The integrated RF device of claim 2, wherein said RF test source comprises a tone generator.

8. The integrated RF device of claim 7, wherein said tone generator comprises a frequency divider and an injection locked frequency tripler.

9. The integrated RF device of claim 8, wherein said tone generator further comprises an additional injection locked frequency tripler configured to reduce sub-harmonic content.

10. The integrated RF device of claim 8, wherein said tone generator further comprises a servo controlled attenuator configured to level a tone generator output power at different frequencies.

11. The integrated RF device of claim 2, wherein said RF test source comprises a noise source.

12. The integrated RF device of claim 2, wherein said at least one second mixer stage comprises an I second mixer and a Q second mixer and said at least one baseband output terminal comprises at least one I baseband output terminal and at least one Q baseband output terminal.

13. The integrated RF device of claim 2, wherein at least one of said at least one RF amplifier and said baseband amplifier comprises a selected one of a tunable capacitor actuator, a tunable compensation resistor actuator, and a tunable bias DAC actuator.

14. The integrated RF device of claim 13, wherein said tunable capacitor actuator comprises a switch selected varactor capacitor.

15. The integrated RF device of claim 13, wherein said tunable compensation resistor actuator comprises a negative resistance configured to perform at least a selected one of gain adjustment and compensation for inductor loss.

16. The integrated RF device of claim 13, wherein at least one of said at least one RF amplifier and said baseband amplifier comprises a variable gain amplifier (VGA) having a plurality of switch selectable gain stages.

17. The integrated RF device of claim 16, wherein said plurality of switch selectable gain stages comprise a plurality of binary weighted gain stages.

18. The integrated RF device of claim 2, wherein said at least one RF amplifier has two input terminals comprising a first input terminal configured to be electrically coupled to said RF input terminal and a second input terminal configured to be electrically coupled to said RF test source.

19. The integrated RF device of claim 2, wherein said RF test source is enabled during a self healing calibration.

20. The integrated RF device of claim 2, further comprising additional sets of said RF amplifier, said RF test source, said first mixer stage including a first local oscillator, said at least one second mixer stage including a second local oscillator, said at least one baseband amplifier electrically coupled to said second mixer stage configured to provide a receiver having two or more bands.

* * * * *